(12) United States Patent
Burke, Jr. et al.

(10) Patent No.: US 12,047,355 B2
(45) Date of Patent: Jul. 23, 2024

(54) MACHINE LEARNING TECHNIQUES FOR MITIGATING AGGREGATE EXPOSURE OF IDENTIFYING INFORMATION

(71) Applicant: Adobe Inc., San Jose, CA (US)

(72) Inventors: Robert W. Burke, Jr., Georgetown, TX (US); Ronald Oribio, Austin, TX (US)

(73) Assignee: Adobe Inc., San Jose, CA (US)

( * ) Notice: Subject to any disclaimer, the term of this patent is extended or adjusted under 35 U.S.C. 154(b) by 666 days.

(21) Appl. No.: 17/195,349

(22) Filed: Mar. 8, 2021

(65) Prior Publication Data
US 2022/0286438 A1  Sep. 8, 2022

(51) Int. Cl.
*H04L 9/40* (2022.01)
*G06N 3/04* (2023.01)
*G06N 3/08* (2023.01)

(52) U.S. Cl.
CPC ........... *H04L 63/0428* (2013.01); *G06N 3/04* (2013.01); *G06N 3/08* (2013.01)

(58) Field of Classification Search
USPC ...................................... 726/22–26
See application file for complete search history.

(56) References Cited

U.S. PATENT DOCUMENTS

| | | | |
|---|---|---|---|
| 9,910,994 B1 * | 3/2018 | Sharifi Mehr | G06F 21/554 |
| 10,873,456 B1 * | 12/2020 | Dods | H04L 9/0822 |
| 10,891,648 B1 * | 1/2021 | Smith | G06Q 30/0241 |
| 11,620,410 B1 * | 4/2023 | Deng | G06F 21/64 |
| | | | 726/25 |
| 11,636,213 B1 * | 4/2023 | Elgressy | H04L 63/0263 |
| | | | 726/25 |
| 11,640,452 B2 * | 5/2023 | Streit | H04L 9/0897 |
| | | | 713/186 |
| 11,641,370 B2 * | 5/2023 | Costante | H04L 63/20 |
| | | | 726/23 |

(Continued)

OTHER PUBLICATIONS

U.S. Appl. No. 17/093,175 entitled "Machine Learning Modeling for Protection Against Online Disclosure of Sensitive Data" filed Nov. 9, 2021.

(Continued)

*Primary Examiner* — Kambiz Zand
*Assistant Examiner* — Mahabub S Ahmed
(74) *Attorney, Agent, or Firm* — Kilpatrick Townsend & Stockton LLP

(57) ABSTRACT

Systems and methods mitigate aggregate exposure of identifying information using machine learning. A privacy monitoring system identifies entities and corresponding entity types by applying a set of domain-specific neural networks, each trained to recognize a particular entity type, to media data extracted from two or more content items associated with a user. The privacy monitoring system computes a privacy score indicating a cumulative privacy risk for potential exposure of identifying information associated with the user from the two or more content items by identifying connections between the identified entities. The connections between the entities are weighted according to the entity types and contribute to the privacy score. A reporting subsystem outputs an indication of a recommended action for mitigating the cumulative privacy risk.

20 Claims, 9 Drawing Sheets

(56) References Cited

U.S. PATENT DOCUMENTS

| | | | | |
|---|---|---|---|---|
| 11,698,990 | B2* | 7/2023 | McFall | G06F 21/6245 726/26 |
| 2004/0083389 | A1* | 4/2004 | Yoshida | H04L 43/0876 709/224 |
| 2009/0254572 | A1* | 10/2009 | Redlich | G06Q 10/10 |
| 2010/0257577 | A1* | 10/2010 | Grandison | G06F 21/6245 726/1 |
| 2012/0072991 | A1* | 3/2012 | Belani | H04W 12/02 726/25 |
| 2012/0250951 | A1* | 10/2012 | Chen | G06Q 50/01 382/118 |
| 2012/0303558 | A1* | 11/2012 | Jaiswal | G06N 20/00 706/12 |
| 2013/0282504 | A1* | 10/2013 | Lessin | H04L 51/52 705/26.1 |
| 2013/0297619 | A1* | 11/2013 | Chandrasekaran | G06Q 50/01 707/E17.058 |
| 2013/0298256 | A1* | 11/2013 | Barnes | H04L 63/04 726/26 |
| 2013/0340089 | A1* | 12/2013 | Steinberg | G06Q 50/01 726/27 |
| 2014/0082740 | A1* | 3/2014 | Knijnenburg | H04L 67/535 726/26 |
| 2014/0282977 | A1* | 9/2014 | Madhu | H04L 63/1433 726/7 |
| 2014/0317736 | A1* | 10/2014 | Cao | H04L 63/1483 726/23 |
| 2015/0128285 | A1* | 5/2015 | LaFever | H04L 63/0414 726/26 |
| 2015/0205954 | A1* | 7/2015 | Jou | G06F 21/316 726/22 |
| 2016/0173520 | A1* | 6/2016 | Foster | G06F 21/316 726/25 |
| 2016/0283975 | A1* | 9/2016 | Kaul | G06Q 30/0248 |
| 2017/0099291 | A1* | 4/2017 | Clark | H04L 63/126 |
| 2017/0193218 | A1* | 7/2017 | Shin | G06F 21/556 |
| 2017/0353423 | A1* | 12/2017 | Morrison | H04L 51/214 |
| 2018/0232528 | A1* | 8/2018 | Williamson | G06N 5/025 |
| 2018/0285599 | A1* | 10/2018 | Praveen | G06F 18/22 |
| 2018/0285879 | A1* | 10/2018 | Gadnis | G06Q 20/38215 |
| 2019/0019110 | A1* | 1/2019 | Sharifi | H04L 63/083 |
| 2019/0138656 | A1* | 5/2019 | Yang | G06N 3/045 |
| 2019/0139085 | A1* | 5/2019 | Lee | G06Q 50/01 |
| 2019/0386896 | A1* | 12/2019 | Ghosh | H04L 43/04 |
| 2020/0042837 | A1* | 2/2020 | Skinner | H04L 63/102 |
| 2020/0106797 | A1* | 4/2020 | Christian | H04L 63/1483 |
| 2020/0202271 | A1* | 6/2020 | Brannon | G06F 21/552 |
| 2020/0204574 | A1* | 6/2020 | Christian | G06F 18/23 |
| 2020/0234243 | A1* | 7/2020 | Miron | G06F 21/6263 |
| 2020/0273580 | A1* | 8/2020 | Kaszuba | G06F 18/251 |
| 2020/0280530 | A1* | 9/2020 | Kessler | H04L 47/50 |
| 2020/0327252 | A1* | 10/2020 | Mcfall | G06F 21/78 |
| 2020/0336501 | A1* | 10/2020 | Lewis | G06F 21/6263 |
| 2020/0356676 | A1* | 11/2020 | Gorlamandala | G06F 21/577 |
| 2020/0387570 | A1* | 12/2020 | Biswas | G06F 40/30 |
| 2020/0389470 | A1* | 12/2020 | Kursun | G06N 20/00 |
| 2021/0089620 | A1* | 3/2021 | Finkelshtein | G10L 15/19 |
| 2021/0097384 | A1* | 4/2021 | Jain | G06F 16/9535 |
| 2021/0160221 | A1* | 5/2021 | Barmpalios | G06N 3/08 |
| 2021/0224586 | A1* | 7/2021 | Wang | G06F 18/213 |
| 2021/0312191 | A1* | 10/2021 | Goncharov | G06F 21/6254 |
| 2021/0357957 | A1* | 11/2021 | VanLandeghem | H04L 67/306 |
| 2021/0374891 | A1* | 12/2021 | Menon | G08B 21/02 |
| 2021/0383518 | A1* | 12/2021 | Zhang | G06V 30/414 |
| 2021/0385250 | A1* | 12/2021 | Sartor | G06F 21/6245 |
| 2022/0027508 | A1* | 1/2022 | Rao | G06N 7/01 |
| 2022/0164874 | A1* | 5/2022 | Sindlar | G06F 21/6245 |
| 2022/0179978 | A1* | 6/2022 | Stroila | G06N 5/04 |
| 2022/0207442 | A1* | 6/2022 | Sarkar | G06N 3/08 |
| 2022/0239848 | A1* | 7/2022 | Swierk | H04N 7/147 |
| 2022/0269977 | A1* | 8/2022 | Yu | H04L 63/1425 |
| 2022/0277097 | A1* | 9/2022 | Cabot | H04W 12/02 |
| 2022/0309333 | A1* | 9/2022 | Souche | G06N 3/045 |
| 2022/0335153 | A1* | 10/2022 | Herman | G06N 3/094 |

OTHER PUBLICATIONS

Balaban, Stephen, "Deep learning and face recognition: the state of the art", Proc. SPIE 9457, Biometric and Surveillance Technology for Human and Activity Identification XII, 94570B, May 15, 2015, 9 pages.

Chachada et al, "Environmental sound recognition: A survey", vol. 3, 2014, 15 pages. doi:10.1017/ATSIP.2014.12.

Ghosh et al., "Understanding Deep Learning Techniques for Image Segmentation", Jul. 2019, 58 pages.

Padmanabhan, Jayashree "Machine Learning in Automatic Speech Recognition: A Survey" IETE Technical Review, published Feb. 2015, 14 pages.

Zou et al., "Object Detection in 20 Years: A Survey", arXiv: 1905.05055, May 16, 2019, 1-39 pages.

\* cited by examiner

MACHINE LEARNING TECHNIQUES FOR MITIGATING AGGREGATE EXPOSURE OF IDENTIFYING INFORMATION

TECHNICAL FIELD

This disclosure generally relates to using artificial intelligence to prevent inadvertent disclosure of sensitive data. More specifically, but not by way of limitation, this disclosure relates to techniques for using domain-specific neural networks with content editing tools to prevent or mitigate, in real time, inadvertent disclosure and dissemination of sensitive data.

BACKGROUND

Content editing tools often present a risk that sensitive information, such as personally identifying information, could be inadvertently disclosed when a user prepares content to share on the Internet. For instance, a user could enter seemingly innocuous information into an online forum, such as a picture of the user's neighborhood, that could be used in combination with other online content to identify sensitive information about the user. As an example, artificial intelligence tools could be used to discern personally identifying information from this seemingly innocuous content, which poses a computer security problem. In some cases, the online nature of certain content editing tools presents unique risks of allowing this sensitive data, once inadvertently disclosed, to be rapidly disseminated, sometimes irrevocably. As the amount of information posted to the Internet by individuals rapidly increases, so do privacy concerns due to the exposure of personally identifying information. Seemingly innocent data elements when aggregated can provide a complete view of someone that they never intended to release or realized was available through their interactions with the Internet.

SUMMARY

Certain embodiments involve techniques for using machine learning models to mitigate aggregate exposure of identifying information.

In some embodiments, a computer-implemented method includes identifying, with an entity identification subsystem, a plurality of entities and an entity type for each entity of the plurality of entities by at least applying a set of domain-specific neural networks, each trained to recognize a particular entity type, to media data extracted from two or more content items associated with a user; computing, by a scoring subsystem, a privacy score indicating a cumulative privacy risk for potential exposure of identifying information associated with the user from the two or more content items, the privacy score computed by identifying connections between at least a subset of the identified plurality of entities, the connections between the entities weighted according to the entity types and contributing to the privacy score; and outputting, by a reporting subsystem, an indication of a recommended action for mitigating the cumulative privacy risk.

In some embodiments, the privacy score is further computed by identifying a user-specific data set comprising identifying information associated with the user; extracting data from the user-specific data set, wherein the extracted data is used to identify additional connections contributing to the privacy score; and updating the user-specific data set to include at least a subset of the identified entities.

In some embodiments, the method further includes identifying, by a PII risk signature subsystem, a privacy breach event associated with the user; and applying a deep learning model to information associated with the privacy breach event to generate a risk signature indicating entity types that pose a heightened risk for the user, wherein the connections between the entities are further weighted based on the generated risk signature.

In some embodiments, a content item of the two or more content items is a video; and the method further comprises extracting the media data from the content item by at least extracting an image from the video; and segmenting the extracted image to isolate one or more of the plurality of entities. In some embodiments, the media data comprises audio signals, the method further comprising extracting audio data from the video; analyzing the extracted audio data for transitions; extracting the audio signals from the analyzed audio data; and segmenting the extracted audio signals to isolate one or more of the plurality of entities.

In some embodiments, the method further comprises training each of the domain-specific neural networks to identify the entities by collecting additional content items from a public source; extracting image or audio data from the collected additional content items; associating the extracted image or audio data with labels for a set of entity types to generate domain-specific training data; and training each domain-specific neural network to identify entity types against the domain-specific training data.

In some embodiments, the method further comprises detecting user interaction with an upload element of a graphical interface; and retrieving a content item of the two or more content items in response to detecting the user interaction with the upload element. In some embodiments, the method further comprises, responsive to outputting the indication of the recommended action for mitigating the cumulative privacy risk, applying a modification to a content item, of the two or more content items. In some embodiments, the method further comprises receiving user identification of a set of data sources, wherein the two or more content items are collected from the identified set of data sources.

In some embodiments, a computing system comprises a content retrieval subsystem configured to retrieve two or more content items associated with a user; a content segmentation subsystem configured to extract data from the two or more content items; an entity identification subsystem configured to identify a plurality of entities and an entity type for each entity of the plurality of entities by at least applying a set of domain-specific neural networks, each trained to recognize a particular entity type, to the extracted data; a scoring subsystem configured to compute a privacy score indicating a cumulative privacy risk for potential exposure of identifying information associated with the user from the two or more content items, the privacy score computed by identifying connections between at least a subset of the identified plurality of entities, the connections between the entities contributing to the privacy score based on weights assigned to links between the entities in a graph model according to identified entity types for the respective entities; and a reporting subsystem configured to output an indication of a recommended action for mitigating the cumulative privacy risk.

In some embodiments, a non-transitory computer-readable medium has instructions stored thereon, the instructions executable by a processing device to perform operations comprising retrieving two or more content items associated with a user; a step for computing a privacy score indicating a cumulative privacy risk for potential exposure of identifying information associated with the user from the two or more content items using a set of domain-specific neural networks trained to identify entities of specific types within the content items; and outputting an indication of a recommended action for mitigating the cumulative privacy risk.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
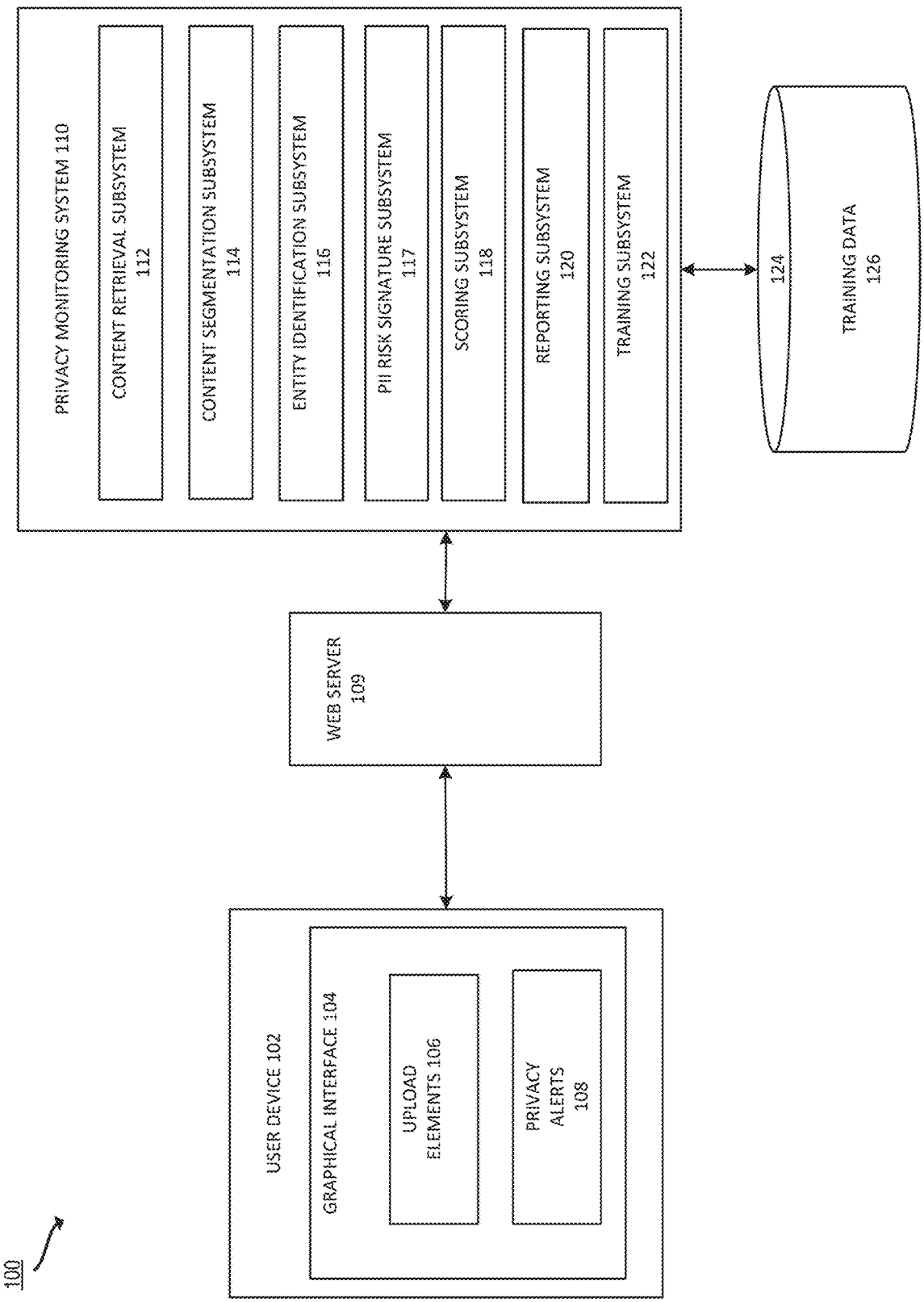
FIG. 1 depicts an example of a computing environment in which machine learning models predict and recommend actions to prevent inadvertent disclosure of sensitive information, according to certain embodiments of the present disclosure.

The present disclosure includes systems and methods for using domain-specific neural networks with content editing tools to prevent or mitigate inadvertent disclosure and dissemination of sensitive data via such content editing tools. As explained above, online services and other content editing tools present a risk of inadvertently disclosing information that poses a privacy risk in conjunction with other online content. This information can be rapidly disseminated via the Internet or other data networks. Certain embodiments described herein address this risk by using machine learning models to detect potentially problematic content (e.g., during an editing phase) and indicate potential modifications to the content that would reduce the disclosure of sensitive data. For instance, such embodiments involve computing systems that analyze content items such as image, video, text, and audio content, which a user posted or is preparing to post. These computing systems apply machine learning models to the content items to identify entities depicted or described with the content items. This may include identifying a building in a video, the sound of a passing airplane in a video, a face in an image, an address in Global Positioning Satellite (GPS) image metadata, a name in a text post, and so forth. The computing system uses these identified entities to generate a privacy score based on connections between the entities. Based on the privacy score, the computing system displays information which can encourage a user to modify a content item to mitigate the exposure of identifying information.

The following non-limiting example is provided to introduce certain embodiments. In this example, a privacy monitoring system retrieves content items associated with a user from sources including a set of websites and applications. The privacy monitoring system analyzes the content items using a set of domain-specific neural networks to predict an aggregate exposure of identifying information. Privacy issues may stem from publicly available content that exposes identifying information about a user. Even if the content items do not explicitly include what is traditionally considered as personally identifying information (PII), some seemingly innocuous publicly accessible content can be used in the aggregate to identify an individual. For example, another entity can access and use a seemingly innocuous set of public images associated with a person to triangulate a user's place of residence or other places frequently visited by that person.

Continuing with this example, the privacy monitoring system extracts media data from content items associated with a user. As a specific example, the privacy monitoring system applies an image segmentation algorithm to a still image that has been isolated from a publicly posted video. The image segmentation algorithm identifies several buildings and people's faces from the still image. The privacy monitoring system applies another machine learning model to audio extracted from the video to isolate words including a street name and a person's name. The privacy monitoring system performs similar analysis on other videos and images posted to the user's social media profiles.

The privacy monitoring system applies a set of domain-specific neural networks to the extracted media data. Each of the domain-specific neural networks is trained to recognize entities of a particular type. The entities are objects, sounds, words, phrases, or numbers that the privacy monitoring system recognizes using the domain-specific neural networks. The identified entities include a street name, building, bridge, person, and medical status. Each domain-specific neural network was previously trained by the privacy monitoring system to identify certain types of entities associated with potentially identifying information (e.g., the privacy monitoring system trains a "place" neural network is executed to identify buildings and landmarks, and trains a "person" neural network to identify the names and faces of people). The privacy monitoring system identifies entities (e.g., the Empire State Building) and corresponding entity types (e.g., location).

Continuing with this example, the privacy monitoring system computes a privacy score indicating a cumulative privacy risk for potential exposure of identifying information associated with the user from the analyzed content items. The privacy monitoring system computes the privacy score identifying connections between at least a subset of the identified plurality of entities, the connections between the entities contributing to the privacy score. In some embodiments, based on the types of entities and their location on the Internet, the privacy monitoring system generates a graph model with links between the entities of varying weights. The weights vary according to the similarity of the entities and proximity between the entities. For example, a street number and street name are linked with a heavier weight than a street number and a medical condition. Two entities identified in a same image are linked with a heavier weight than two entities identified on different websites. Along with the recently-detected entities, the system maintains a data store of identifying information specific to the user, and uses this additional identifying information to build out the graph model. The privacy monitoring system computes a privacy score which is a function of the weighted connections between the entities.

In this example, the privacy monitoring system outputs an indication of a recommended action for mitigating the cumulative privacy risk associated with the privacy score. For instance, if this privacy score exceeds one or more thresholds, then the privacy monitoring system determines that one or more of the content items should be modified to reduce the risk of sensitive data being exposed. The privacy monitoring system, in some embodiments, identifies suggested modifications (e.g., remove a video, edit a photo to blur out a street sign, remove metadata from an image, etc.) that will reduce the privacy score. The privacy monitoring system outputs the indication of the recommended action for reporting (e.g., via a graphical interface of a device operated by the user).

As described herein, certain embodiments provide improvements to computing environments by solving problems that are specific to online media sharing environments. These improvements include providing feedback that alerts a user to potential disclosure of sensitive data on the Internet. Online computing environments pose unique risks for this type of sensitive data exposure, as the Internet or other data networks allow for nearly instantaneous transmission and publication to a large number of recipients, whereas the utility provided by an online content editing tool (e.g., publication via the click of a single button) heightens the risk that this publication and transmission could occur accidentally. Furthermore, the wide variety of information available via the Internet limits the ability of a user to accurately determine whether any given piece of data posted in an online forum could be combined with other publicly available data to identify the user. Because these problems are specific to computing environments, embodiments described herein utilize machine-learning models and other automated models that are uniquely suited for mitigating the risk of inadvertently disseminating user data via the Internet or other data network. For instance, a computing system automatically applies various rules of a particular type (e.g., various functions captured in one or more models) to a variety of media data that has been or is about to be posted on the Internet. The rules can be more effective in detecting potential disclosure of sensitive data at least because the system is trained using a large corpus of information to identify and quantify different levels of sensitive private information in media data, rather than relying on subjective judgments of a user posting the content.

Example of an Operating Environment for Mitigating Aggregate Exposure of Identifying Information FIG. 1 depicts an example of a computing environment 100 in which machine learning models are applied to online content to indicate content modifications for addressing potential privacy breaches. In the example depicted in FIG. 1, a user device 102 posts information via a web server 109. A privacy monitoring system 110 evaluates the information to identify privacy issues using a content retrieval subsystem 112, content segmentation subsystem 114, entity identification subsystem 116, PII risk signature subsystem 117, scoring subsystem 118, and reporting subsystem 120. The subsystems include one or more trained machine learning models which are trained using a training subsystem 122 using training data 126.

The various subsystems of the privacy monitoring system 110 can be implemented in the same computing system or different, independently operated computing systems. For example, the training subsystem 122 could be a separate entity from the content segmentation subsystem 114, the entity identification subsystem 116, the PII risk signature subsystem 117, and the scoring subsystem 118, or the same entity. Different, independently operating web servers 109 can communicate with the privacy monitoring system 110, or the privacy monitoring system 110 can be part of the same online service as the web server 109. While the system of FIG. 1 can be used, other embodiments can involve the privacy monitoring system 110 being built into a software application executed on the user device 102, e.g., as a plug-in to content editing software.

Some embodiments of the computing environment 100 include a user device 102. Examples of a user device include, but are not limited to, a personal computer, a tablet computer, a desktop computer, a processing unit, any combination of these devices, or any other suitable device having one or more processors. A user of the user device 102 interacts with a graphical interface 104 by exchanging data with web server 109 and privacy monitoring system 110 via a data network.

The user device is communicatively coupled to the web server 109 and the privacy monitoring system 110 via the data network. Examples of the data network include, but are not limited to, internet, local area network ("LAN"), wireless area network, wired area network, wide area network, and the like.

The graphical interface 104 is an interface such as a Graphical User Interface (GUI) that is capable of displaying and receiving information. In some embodiments, the graphical interface 104 includes a content-editing tool for receiving and modifying content (e.g., content to be posted online). The graphical interface 104 includes one or more upload elements 106 for uploading content (e.g., an upload field to upload a video or image to be shared online). In some implementations, the graphical interface 104 responds to user selection of an upload element 106 by transitioning to a view showing available files to upload, prompt a user to take a photo, or the like.

The graphical interface 104 is further configured to display privacy alerts 108 responsive to signals from the privacy monitoring system 110 (directly or by way of web server 109). For example, the privacy alerts 108 include information characterizing a risk associated with a content item or portion thereof (e.g., a privacy risk score, different color flags, warnings, and so forth). In some implementations, the privacy alerts 108 indicate portions of the content item which are associated with a potential exposure of identifying information (e.g., highlighting, circling, bubbles with explanatory text, etc.).

In some embodiments, the web server 109 is associated with an entity such as a social network, online merchant, or various different websites that allow users to post information. The web server 109 includes functionality to serve a website (which can include a content editing tool) and accept input for modifying the website from the user device 102 and/or privacy monitoring system 110. In some implementations, the web server 109 is a separate entity and separate computing device from the privacy monitoring system 110. Alternatively, in some implementations, the web server 109 is a component of the privacy monitoring system 110.

The privacy monitoring system 110 monitors for updated information received from the user device 102 via the graphical interface 104, and analyzes the information for a privacy risk. In some embodiments, an indication of the privacy risk is then presented by updating the graphical interface 104. The privacy monitoring system 110 includes a content retrieval subsystem 112, content segmentation subsystem 114, entity identification subsystem 116, PII risk signature subsystem 117, scoring subsystem 118, and reporting subsystem 120. The subsystems include one or more trained machine learning models which are trained using a training subsystem 122 using training data 126. In some implementations, the privacy monitoring system 110 further includes, or is communicatively coupled to, one or more data storage units 124 for storing training data 126.

The content retrieval subsystem 112 includes hardware and/or software configured to retrieve content. In some cases, the content retrieval subsystem 112 retrieves content from one or more websites or applications (e.g., by crawling the web). In some cases, the content retrieval subsystem 112 retrieves content that a user is uploading via the graphical interface 104. In some implementations, the content retrieval subsystem 112 is configured to retrieve media such as images and videos uploaded via upload elements 106.

The content segmentation subsystem 114 includes hardware and/or software configured to segment a subset of each content item. For example, for image data, the content segmentation subsystem 114 applies deep learning image segmentation to identify objects such as house numbers, building characteristics, sidewalk/driveway location, landscaping, yard signs, unique embodiments (water, bridge), known location commonalities and the like. In some implementations, the content segmentation subsystem 114 segments video data into still images, and applies deep learning image segmentation to identify objects in one or more of the still images. Alternatively, or additionally, the content segmentation subsystem 114 extracts sound from a video file and performs audio data segmentation to identify distinct sounds in the audio data such as the sound of a car or airplane, particular words spoken, etc. The content segmentation subsystem 114 can perform similar analysis on identified image or audio files. In some implementations, the content segmentation subsystem identifies words from text data, extracted from images, and/or using speech-to-text algorithms. In some implementations, the content segmentation subsystem 114 further analyzes content items to extract metadata such as timestamps, Global Positioning System (GPS) location data, and so forth.

Accordingly, the content segmentation subsystem 114 is configured for processing content such as images, videos, audio data, and text data to identify data and/or metadata. The content segmentation subsystem 114 can extract data types such as locations (e.g., home, church/mosque/temple, job, gym, vacation spot), habits (e.g., shopping, exercising, vacation), persons (e.g., friends, family, coworker, enemy), and time (e.g., time of day, season, displayed time).

The entity identification subsystem 116 includes hardware and/or software configured to apply machine learning models (e.g., domain-specific neural networks) to identify entities (e.g., certain people, places, things, words, numbers, or phrases) associated with privacy risk. An entity can be an image, sound, word, number, or phrase that corresponds to a defined category or type of information. An entity can be associated with a location such as a building, bridge, coffee shop, street, neighborhood, or address. An entity can be associated with a person (e.g., a recognizable face and/or name). Entities may fall into categories or types such as places, things, people, medical conditions, and the like. Certain entities are associated with identifying information, such as location information, medical information, and employment information. Identifying information can include information that could be used to identify an individual or sensitive information about that individual, which may include both PII data and data that can be indirectly used to identify the individual.

In some implementations, the entities are assigned to different domains, and a machine learning model such as a named entity recognizer, image classifier, or combination thereof, is applied to recognize entities of the specific domains. The entity identification subsystem 116 identifies objects, sounds, or texts associated with identifiable information. Examples include house numbers, building characteristics, sidewalk/driveway location, landscaping, yard signs, unique embodiments (water, bridge), known location commonalities and the like. In some embodiments, the entity identification subsystem 116 classifies data according to entity types such as:

Locations (home, church/mosque/temple, job, gym, vacation spot)
Habits (shopping, exercising, vacation)
Persons (friends, family, coworker, enemy)
Time (time of day, season, displayed time)
Preferences (political association, religion, food, etc.).

The PII risk signature subsystem 117 includes hardware and/or software configured to generate risk signatures, which identify categories of identifying information that are particularly risky to a given user. The PII risk signature subsystem 117 uses information about a specific privacy breach event to generate a risk signature. Examples of such privacy breach events include stalking, identity theft, doxing, cyberbullying, property theft, and burglary. The risk signature indicates areas of concern involving specific categories of identifying information, which may include domains, entity types, and/or entities associated with the privacy breach (e.g., the user may have experienced identity theft after exposure of a set of identifying information corresponding to categories of identifying information such as location, habit, person type, time, etc.).

In some embodiments, the PII risk signature subsystem 117 extracts information about a privacy breach event and uses it to identify corresponding categories or domains of identifying information. Such extracted information may include, for example, images associated with a person of interest obtained from a stalker's computer. In some embodiments, the PII risk signature subsystem 117 applies a machine learning model trained to identify correlations between types of PII occurrences associated with an individual and which categories or domains of identifying information pose more risk for that individual. For example, the machine learning model is a deep learning model (e.g., a deep neural network). The model may be applied to the extracted information about one or more privacy breach events, as well as other publicly available information about a particular target user. For example, historical data shows that, for people that have been stalked, data revealing location of residence and other locations frequently visited are particularly risky. For people that have been burglarized when away from home, data revealing when those people go on vacation and go to work are particularly risky. Such correlations are mapped to one another to generate a risk signature.

The PII risk signature subsystem 117 updates the scoring subsystem 118 and/or training data 126 with the generated risk signature, which can be used in the scoring process. For example, the training data 126 is updated to reflect that information related to location is particularly risky for a given user. Alternatively, or additionally, the scoring subsystem is instructed to apply a subset of domain-specific neural networks and/or modify weights according to the risk signatures.

Alternatively, or additionally, the PII risk signature subsystem 117 outputs an outbound risk signature. The risk signature can be ingested, for example, by an external system such as the web server 109 and/or user device 102. As a specific example, a risk signature itself or indication thereof can be displayed via graphical interface 104 (e.g., "Warning! Avoid posting about your vacation based on past event."). Alternatively, or additionally, the privacy monitoring system 110 targets the risk signatures for automatic risk mitigation inside applications. For example, based on a risk signature, the privacy monitoring system 110 automatically blurs out a street number in a photo editing application.

The scoring subsystem 118 includes hardware and/or software configured to generate a privacy score based on the entities identified by the entity identification subsystem 116. For example, the scoring subsystem 118 generates a graph of identified entities. The graph includes nodes representing entities and links between the nodes that represent connections between the entities. The entities and/or links may be assigned weights. For example, the scoring subsystem 118 computes entity weights according to a level of sensitivity of each entity. As a specific example, a social security number is highly protected PII and weighted most heavily. A reflection of a bus stop is not as sensitive on its own and is less heavily weighted. The scoring subsystem 118 also computes link weights for the links that represent a level of connection between the entities. For example, an apartment number and a street address together reveal an exact address, which poses a strong privacy risk. Accordingly, a link between an apartment number and a street address is weighted heavily. More loosely connected entities, such as the name of a city and an image of a friend, are weighted less heavily. The scoring subsystem 118 uses the entity weights and link weights to compute a privacy score representing an aggregate exposure of identifying information from the entities. By computing the privacy score as a function of the weights assigned to the links between the entities, the scoring subsystem 118 generates the privacy score representative of the overall information exposure of the entities as a whole. In some embodiments, the scoring subsystem 118 takes inbound risk signatures from the PII risk signature subsystem 117 and uses the risk signatures to compute the privacy score. For example, the scoring subsystem 118 narrows the scope of analysis to the boundaries of the entity data in the risk signature(s). Alternatively, or additionally, the scoring subsystem 118 adjusts weights in the graph model to reflect correlations identified in the risk signatures (e.g., based on a risk signature indicating that images of the user's face are particularly risky, such images are weighted more heavily).

In some embodiments, the scoring subsystem further identifies suggested actions, particular content items that should be removed or modified, and the like, as described herein.

The reporting subsystem 120 includes hardware and/or software configured to generate and transmit alerts to the user which can include the privacy score and other information generated by the scoring subsystem 118. The reporting subsystem 120 causes a display of privacy alerts 108 via the graphical interface 104. In some implementations, the reporting subsystem 120 causes display of a privacy alert 108 by transmitting instructions for displaying the privacy alert 108 on a display device coupled to the reporting subsystem. In alternative embodiments, the reporting subsystem 120 transmits information to another device (e.g., the web server 109), which displays the privacy alert 108. The privacy alerts 108 include graphical displays such as text, highlighted portions of images, and the like. In additional or alternative embodiments, the privacy alerts 108 include audio alerts such as a beep or speech output.

The training subsystem 122 includes hardware and/or software configured to train one or more machine learning models as used by the content segmentation subsystem 114, entity identification subsystem 116, and/or scoring subsystem 118. An example of a training process is described below with respect to FIG. 6.

The data storage unit 124 can be implemented as one or more databases or one or more data servers. The data storage unit 124 includes training data 126 that is used by the training subsystem 122 and other engines of the privacy monitoring system 110, as described in further detail herein. The training data 126 generated by the PII risk signature subsystem 117 can represent some or all of the training data 126 (e.g., risk signature-based training data can be integrated with general training data that is independent of specific risk signatures, or all training data may be associated with one or more corresponding risk signatures). In some embodiments, the PII risk signature subsystem 117 identifies and expands the training data 126 to include ancillary data based on domains corresponding to the identified PII occurrences.

Figure 2:
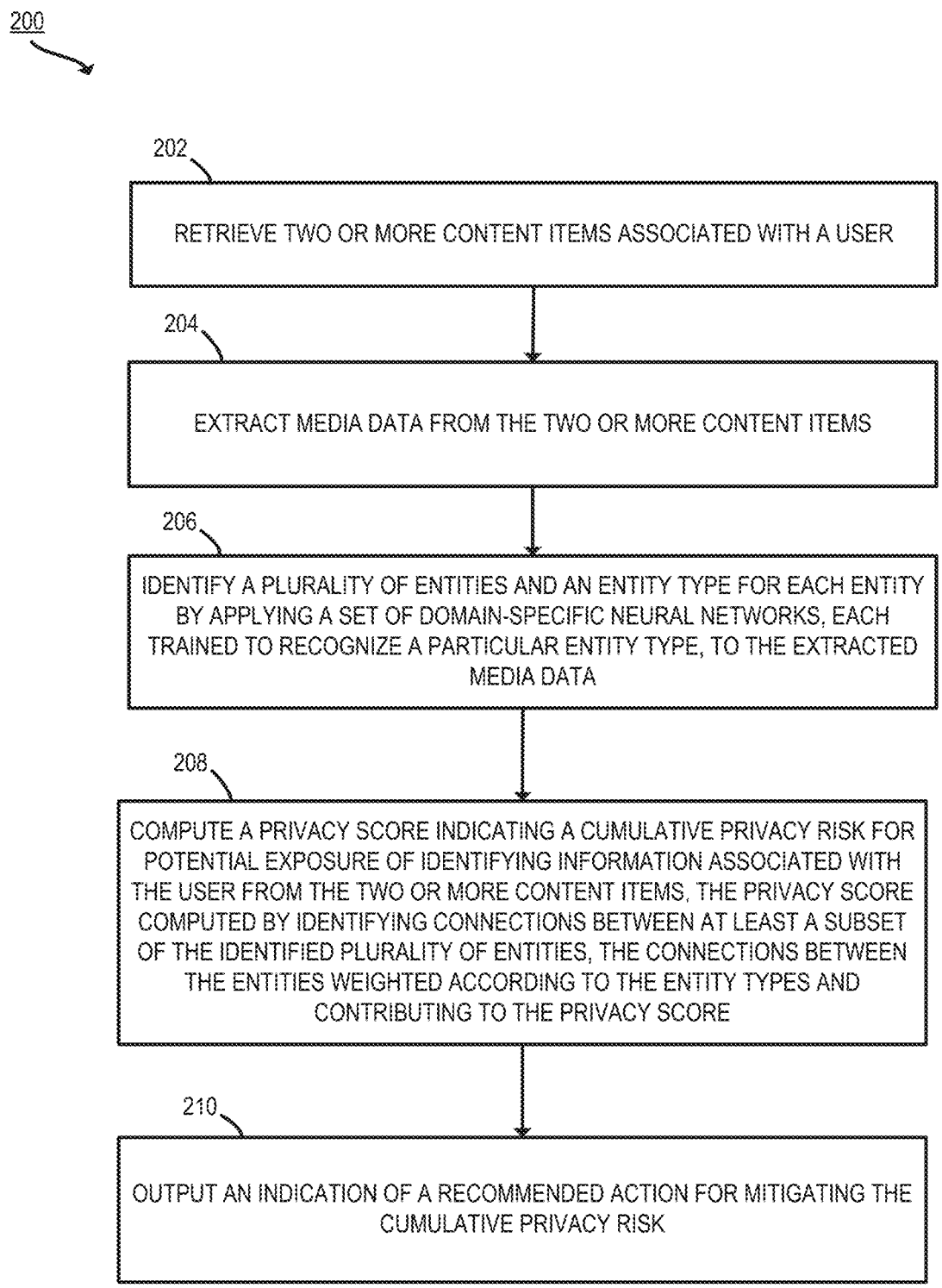
FIG. 2 depicts an example of a process for mitigating aggregate exposure of identifying information, according to certain embodiments of the present disclosure.

Examples of Operations for Mitigating Aggregate Exposure of Identifying Information FIG. 2 depicts an example of a process 200 for updating an interface to indicate recommendations for editing online content to mitigate exposure of identifying information. In this example, the privacy monitoring system 110 retrieves and processes content in a pipeline including the content retrieval subsystem 112, content segmentation subsystem 114, entity identification subsystem, and scoring subsystem 118. If a cumulative privacy risk is identified in connection with the content, then the reporting subsystem 120 outputs an indication of a recommended action for mitigating the cumulative privacy risk, which can cause modification of one or more content items. In some embodiments, one or more processing devices implement operations depicted in FIG. 2 by executing suitable program code. For illustrative purposes, the process 200 is described with reference to certain examples depicted in the figures. Other implementations, however, are possible.

At block 202, the content retrieval subsystem retrieves two or more content items associated with a user. A processing device executes program code of the content retrieval subsystem 112 to implement block 202. For example, the program code for the content retrieval subsystem 112, which is stored in a non-transitory computer-readable medium, is executed by one or more processing devices.

In one example, the content retrieval subsystem retrieves several photographs from a social media site. Alternatively, or additionally, the content retrieval subsystem retrieves content as the user is uploading or editing the content. For example, the content retrieval subsystem is integrated into an interface for uploading content to a website. As a specific example, a website includes an upload element for uploading images or other data files. When a user initiates uploading a file via the upload element, the content retrieval system retrieves the file. As another example, the content retrieval subsystem is integrated into a camera application (e.g., Adobe Photoshop Camera®). In such implementations, the privacy monitoring system analyzes an aggregate exposure risk in light of the content to be posted on-the-fly. In other words, the content retrieval subsystem detects user interaction with an upload element of a graphical interface and retrieves a content item (e.g., of the one or more content items) in response to detecting the user interaction with the upload element.

In some embodiments, the content retrieval subsystem retrieves content from a variety of different sources and/or of a variety of different types. For example, the content retrieval subsystem retrieves content including images, videos, audio files, and structured or unstructured text. Sources can include blogs, social media sites or applications, live streams, corporate or school websites, real estate listings, and so forth.

In some embodiments, the data is retrieved according to user-configured parameters. For example, the content retrieval subsystem identifies stored configuration parameters specifying a particular source or set of sources. As a specific example, the privacy monitoring system operates as a web service, with an interface allowing a user to identify sources or types of sources (e.g., "social media" in general, one or more specific social media sites, etc.). In some implementations, prior to retrieving the content items, the privacy monitoring system receives user identification of a set of data sources. The privacy monitoring system collects content items from the identified set of data sources. The user identification can describe the depth or the boundaries of the data retrieval, by indicating sites or a category of sites. The user identification can alternatively or additionally identify information or a category of information. For example, the privacy monitoring system receives user input indicating that the user is concerned about exposing images or other information about the user's children. In some implementations, narrowing the scope of the content to be retrieved and analyzed reduces the time and computing resources required to perform the risk assessment described herein. Alternatively, or additionally, the privacy monitoring system performs an assessment without initial configuration and/or request from a user. For example, the privacy monitoring system crawls the web and retrieves data broadly. As a specific example, a social media service includes the privacy monitoring system as a feature to perform the assessment of blocks 202-210 on behalf of users.

One or more operations in blocks 204-210 implement a step for computing a privacy score indicating a cumulative privacy risk for potential exposure of identifying information associated with a user. For instance, at block 204, the content segmentation subsystem extracts media data from a set of content items retrieved at block 202. The content segmentation subsystem extracts media data such as distinct parts of an image (e.g., a face or a building) or parts of a sound file (e.g., a distinct sound such as a train or a spoken word). Alternatively, or additionally, the content segmentation subsystem extracts text data which from an image or in a text file.

In some embodiments, a content item from the set of content items is a video. To extract the media data from the content item, the content segmentation subsystem extracts an image from the video and segments the extracted image to isolate a portion of the image. For example, the content segmentation subsystem identifies a set of frames that make up a video and selects at least some of these frames for further analysis. For a given frame, the content segmentation subsystem applies one or more machine learning models to discern different objects in the frame. Suitable models include image segmentation models (e.g., as described in Ghosh et al., Understanding Deep Learning Techniques for Image Segmentation, *ACM Computing Surveys*, No. 73, https://doi.org/10.1145 (August 2019)), object detection models (e.g., as described in Zou et al., *Object Detection in 20 Years: A Survey*, arXiv:1905.05055 (May 2019)), and facial recognition algorithms (e.g., as described in Stephen Balaban, "Deep learning and face recognition: the state of the art," Proc. SPIE 9457, *Biometric and Surveillance Technology for Human and Activity Identification XII*, 94570B (15 May 2015); https://doi.org/10.1117/12.2181526). Similarly, the content segmentation system may apply a machine learning model to discern objects within image files retrieved at block 202.

In some embodiments, the media data includes audio signals. For example, the content segmentation subsystem extracts audio data from a video and analyzes the extracted audio data for transitions. The content segmentation subsystem extracts the audio signals from the analyzed audio data and segments the extracted audio signals to isolate a portion of the audio data. In some embodiments, the content segmentation subsystem translates audio data to text. The content segmentation subsystem analyzes ambient noise by applying one or more machine learning models to identify objects, locations, and other information. Suitable algorithms for identifying sounds include environmental sound recognition models (e.g., as described in Chachada, S., & Kuo, C., Environmental sound recognition: A survey. *APSIPA Transactions on Signal and Information Processing*, 3, E14. doi:10.1017/ATSIP.2014.12 (2014)) and speech recognition models (e.g., as described in Padmanabhan et al., Machine Learning in Automatic Speech Recognition: A Survey, *IETE Technical Review*, 32:4, 240-251, DOI: 10.1080/02564602.2015.1010611 (2015)). Similarly, the content segmentation system may apply a machine learning model to discern sounds within audio files retrieved at block 202.

Alternatively, or additionally, the content segmentation subsystem analyzes the content items to identify words, phrases, and/or numbers. For example, an image includes the name of a street, building, or bus stop. The media processing subsystem performs optical character recognition on a picture or video still to identify any words therein. In some implementations, the content segmentation subsystem further processes a content item to identify metadata. In some embodiments, the content segmentation subsystem extracts metadata from a received media file (e.g., a Joint Photographic Experts Group (JPEG) file, Moving Picture Expert Group-4 Part 14 (MP4) file, etc.).

At block 206, the entity identification subsystem identifies a set of entities and an entity type for each entity. The entity identification subsystem identifies the entities and respective entity types by applying a set of domain-specific neural networks, each trained to recognize a particular entity type, to the extracted media data. As further described below with respect to FIG. 6, the neural networks are initially trained to identify user-specific data against larger geographic, habit domain, persons, and other large data sets to determine associations between the focal user and expanded data available from those image and other data domains. For example, someone in a photo with the target user has pictures in the same gym as the target user or is pictured outside the target user's house, which can lead to exposure of information about the target user from content associated with the other person.

In some embodiments, the entity identification subsystem applies deep learning image segmentation pattern learning methods for object identification. This can be executed in combination with the processing of block 204 (e.g., using a neural network trained to both extract and classify entities), or separately (e.g., to assign an entity classification to an object after segmenting the object).

In some embodiments, the domain-specific neural networks include an image classifier. For example, the entity identification subsystem uses deep learning facial recognition learning methods to identify the primary focal user of the assessment and other persons in images with the focal user. Alternatively, or additionally, in some embodiments, the domain-specific neural networks include a named entity recognizer which has been trained to identify certain words or categories of words associated with a privacy risk. A named entity recognizer processes text data to identify entities within the text data, and then tags the text data with information related to the identified entities.

The privacy monitoring system trains each domain-specific neural network using techniques such as those described below with respect to FIG. 6. In some implementations, the neural networks include a recurrent neural network (RNN), convolutional neural network (CNN), and/or deep neural network. In some implementations, one or more of the domain-specific neural networks are part of an ensemble model (e.g., including a neural network and another type of model such as a rules-based model). In alternative implementations, other types of machine models can be used (e.g., rules-based models, decision trees, and so forth).

In some embodiments, the entity identification subsystem classifies each identified entity according to an entity type, such as locations, habits, persons, time, and preferences. Examples of entities associated with privacy risk include names, streets, and local landmarks such as schools, museums, bus stops, and so forth. Other examples of entities associated with privacy risk include information about health conditions, information about familial status, and information about employment status. The entity identification subsystem focuses on individual identifiable information. Examples include house numbers, building characteristics, sidewalk/driveway location, landscaping, yard signs, unique embodiments (water, bridge), known location commonalities and the like.

Figure 6:
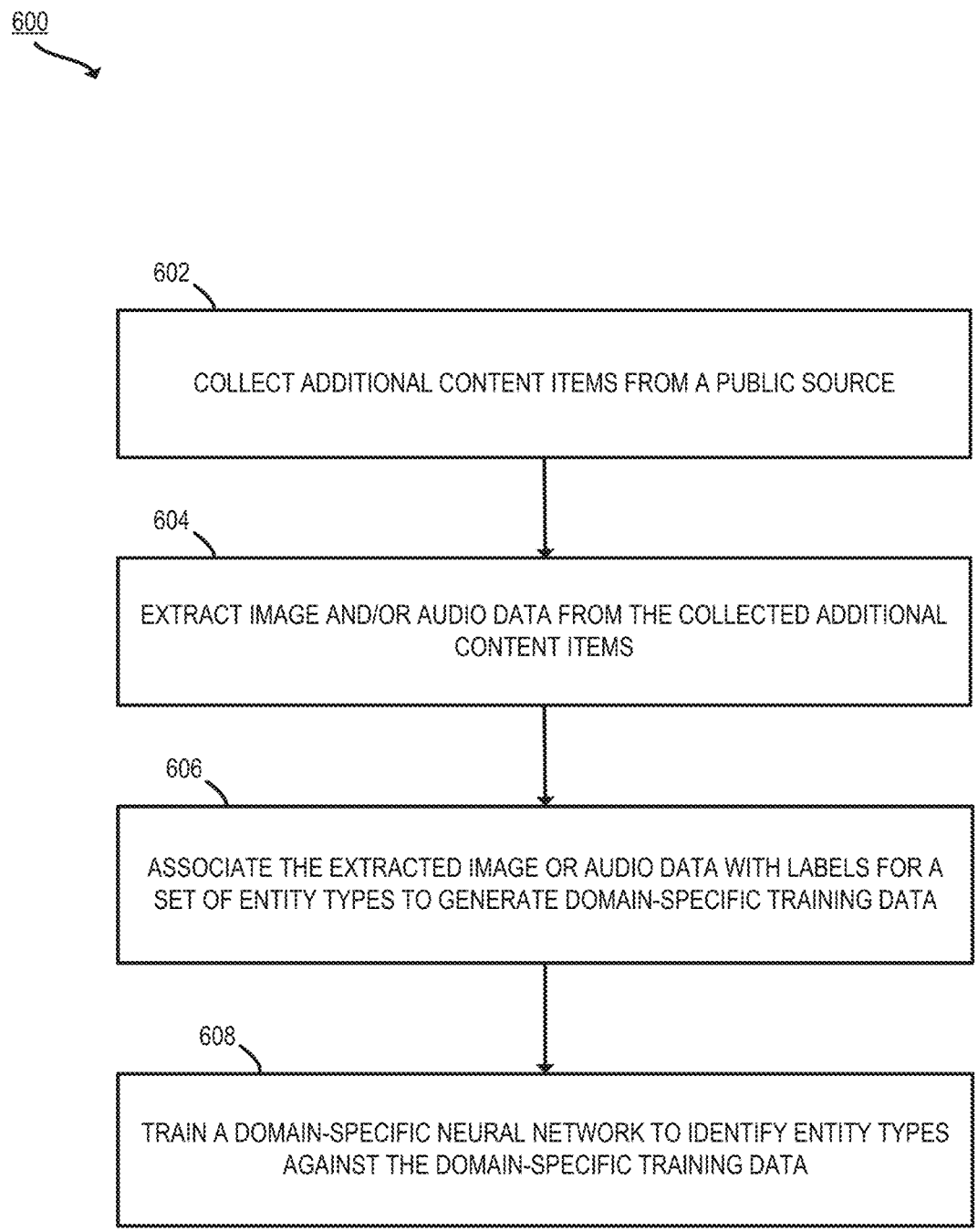
FIG. 6 depicts an example of a process for training a machine learning model as used in the process of FIG. 2, according to certain embodiments of the present disclosure.

As described further with respect to FIG. 6, in some implementations a set of domain-specific neural networks are trained to recognize entities in different domains. The use of domain-specific neural networks is advantageous in that each domain-specific neural network can execute faster that a neural network that has been trained to recognize entities across all domains. For example, a neural network that is trained to recognize buildings and landmarks can eliminate certain processing and memory overhead associated with performing facial recognition or optical character recognition. Given the a great deal of image and video data that should be processed to perform an accurate privacy evaluation, this reduction of computational resource requirements is important. The privacy monitoring subsystem may execute these multiple domain-specific neural networks in turn. For example, entity identification subsystem applies the media data to multiple domain-specific neural networks in turn (e.g., first to identify people, then to identify locations, and so forth). Alternatively, or additionally, some or all of the domain-specific neural networks are executed concurrently.

Alternatively, or additionally, the privacy monitoring subsystem executes a subset of available domain-specific neural networks depending on the circumstances (e.g., according to a tailored assessment depth). In some embodiments, the depth of the assessment is different depending on the device executing the assessment. In a cloud-based assessment, for example, the privacy monitoring system executes on all or several domains. For an assessment executing on a user device such as a mobile device, a shallower assessment is performed (e.g., using fewer classifications and/or less extensive ancillary data association). The privacy monitoring system may determine whether a local or cloud-based assessment has been initiated, and, based on the determination, execute the corresponding level of assessment. The "shallower" assessment can be both quicker and less computationally expensive, to make it feasible to run on a mobile device. Alternatively, or additionally, an assessment can be performed on mobile device through a local application and cloud service in combination.

At block 208, the scoring subsystem computes a privacy score indicating a cumulative privacy risk for potential exposure of identifying information associated with the user from the content items. The scoring subsystem computes the privacy score by identifying connections between the identified entities. The connections between the entities are weighted according to the entity types identified at block 206 and contribute to the privacy score. As further described below, certain entity types when used together can expose more information about a user than others. The cumulative risk of each pair of entities is used to weight connections in a graph model, which is used to compute the privacy score.

In some embodiments, the scoring subsystem generates a personalized graph model for the user based on the media data extracted at block 204. The graph model is personalized in the sense that it includes entities that can be traced back to the user, which may originate from images posted by or including the user, as well as more tangentially connected data such as a real estate listing of a neighbor's house that can be used to identify the user's address in combination with other publicly available information.

In some embodiments, the scoring subsystem generates the graph model including media data extracted from multiple content items (e.g., multiple reviews, multiple social media posts, etc.). As an example, the content items retrieved at block 202 includes a video already posted by a user and an image that the user is preparing to post. The privacy monitoring system is coupled to other sites such as social media to identify other posts made by the user in other contexts.

In some embodiments, the privacy monitoring subsystem maintains one or more user-specific data sets for the target user. For example, the privacy monitoring subsystem stores the entities identified in association with the user over time to a data set indexed with an identifier of the user. In alternative or additional embodiments, the privacy monitoring subsystem stores multiple user-specific data sets. For example, one data set stores entities representing PII data such as name, social security number, and address. Another data set stores entities associated with identifying information that is not strictly classified as PII data such as an identified building in the user's neighborhood, another individual frequently pictured with the user, the type of car that the user drives, and so forth. When executing the processing of block 206, the scoring subsystem identifies a user-specific data set that includes identifying information associated with the user. The scoring subsystem extracts data from the user-specific data set, and uses the extracted data to identify additional connections contributing to the privacy score. For example, along with ten entities identified from a newly captured image, the scoring subsystem identifies seventy-five previously identified entities. The scoring subsystem generates a graph model for the user that includes all eighty-five entities including those newly identified as well as those in the user-specific data set. The privacy monitoring subsystem may then update the user-specific data set to include some or all of the entities identified at block 206. For example, continuing with the above example, the privacy monitoring subsystem updates the user-specific data set by storing the ten newly identified entities along with the seventy-five previously identified entities.

Together, the scoring subsystem uses this information to generate the graph model. The graph model includes nodes representing the identified entities and connections between the entities weighted according to the relationship between the entities. In some embodiments, the scoring subsystem assigns weights to both the nodes (entity weights) and to the connections between the nodes (link weights).

In some embodiments, the scoring subsystem assigns the entity weights by determining a level of sensitivity of each identified entity. The scoring system labels the entities with different sensitivity categories. According to the sensitivity categories, the scoring subsystem assigns certain entities a higher entity weight than other entities according to entity type. As a specific example, the scoring subsystem weights more specific entities more heavily than more general entities (e.g., the scoring system weights the name of a street that the user lives on more heavily than the name of the continent in which the user lives). In some embodiments, the training subsystem trains the domain-specific neural networks to recognize these sensitivity levels (e.g., using assigned labels). For example, entities related to medical, health and financial information are labeled at a highest level of sensitivity. Another set of entities can then be labeled at a medium level of sensitivity (example: those related to demographic and geolocation). Based on the determined entity types, the scoring subsystem assigns weights to links between the identified entities in the graph model. Links between same or similar entity types are weighted relatively heavily (e.g., a street name and house number). Links between more disparate entity types are weighted less heavily (e.g., a street name and a dog). Thus, the connections between different entities are weighted differently to account for the increased risk of exposing certain entities together. As a specific example, a street name and a city name together pose a relatively large cumulative privacy risk, since they can be used together to identify a location, while the combination of a medication taken and a street name have less of a cumulative privacy risk, since the entities are less related. Accordingly, a link between a street name and city name may be weighted by a factor of 9, while a link between a medication and street name is weighted by a factor of 2.

In some embodiments, the scoring subsystem further bases the weights in the graph model on risk signatures identified by the PII risk signature subsystem. By applying deep learning to identified privacy breach events and entities, the PII risk signature subsystem identifies certain entity types which pose a heightened risk for the user. For example, historically, people that were doxed were associated with exposure of excessive information related to their place of employment and family members. By applying a machine learning model trained to recognize risk signatures indicating correlations between privacy breach events and entities, the PII risk signature subsystem identifies areas of concern involving entity types such as specificity of location, habit, person type, time, etc. In some embodiments, the risk signature subsystem provides a risk signature indicative of these correlations to the scoring subsystem. The scoring subsystem adjusts the weights in the graph model to reflect certain entity types that pose a heightened risk to the user based on prior events associated with the user. In some implementations, the scoring subsystem uses the risk signature to narrow the scope of analysis to the boundaries of the entity data in the risk signature(s). For example, the scoring subsystem and/or entity identification subsystem executes selected domain-specific neural networks according to the risk signature (e.g., if the user is at risk for exposing location information, a location-based neural network is executed to identify entities). By using the risk signatures to refine and target risk data, the privacy monitoring system can further speed up processing and avoid unnecessary computation.

The scoring subsystem can then generate the privacy score as a function of the number of links and the link weights of those links. In some embodiments, the privacy score is based on both the link weights and the entity weights. The connections between the entities contribute to the privacy score according to a cumulative privacy risk— the more information that can be gleaned from entities tied by a given link in combination, the more this link contributes to the privacy score. The resulting score is indicative of an overall exposure of sensitive information.

In some embodiments, the scoring subsystem generates the privacy score as a function of the weighted links between the entities and the sensitivity levels of the entities themselves. For example, the scoring subsystem uses the generated graph model to identify the nodes and links between the nodes, and uses the corresponding weights to compute the privacy score. As a specific example, a privacy score can be computed using the function $$P = 7\sum_i W_{ei} + 5\sum_j W_{lj},$$

where P is the privacy score, $W_{ei}$ is the $i^{th}$ entity weight, and $W_{lj}$ is the $j^{th}$ link weight. In some implementations, the scoring subsystem continually updates the score as additional content is detected. For example, if a user uploads a new image, the scoring subsystem updates the graph model for the user by adding one or more nodes representing one or more entities detected from the image and by computing new weights for the added nodes. The scoring subsystem computes an updated privacy score by using the added or updated weights from the graph model as the input to the function above.

In some embodiments, the weights assigned to links between the entities degrade over time. For example, links between entities in a same posting are weighted more heavily, and the weights degrade over time. As a specific example, an entity in a current post has a link weight 0.7 with another entity in the current post, a link weight of 0.5 with another entity in a post from the previous day, and a link weight of 0.1 with a post from two months ago. This can be achieved, for example, using an exponential function such as $W = w_i^{1/t}$, where W is the time-degraded weight, $w_i$ is the initial weight, and t is the time elapsed since the content was posted.

In some embodiments, the scoring subsystem further uses the privacy score to identify a privacy risk level (e.g., a safety grade). For example, the scoring subsystem compares the computed privacy score to one or more thresholds. If the privacy score is below a threshold, then the privacy risk level is "low;" if the privacy score is below a second threshold, then the privacy risk level is "moderate;" and if the privacy score is equal to or greater than the second threshold, then the privacy risk level is "high."

A processing device executes program code of the scoring subsystem 118 to implement block 208. In one example, the program code for the scoring subsystem 118, which is stored in a non-transitory computer-readable medium, is executed by one or more processing devices. Executing the scoring subsystem 118 causes the processing device to compute the privacy score.

At block 210, the reporting subsystem outputs an indication of a recommended action for mitigating the cumulative privacy risk. As examples, the indication includes text (e.g., "Warning! This image shows your address") and/or highlights portions of a content item that should be edited (e.g., text, part of an image, etc.). In some implementations, the reporting subsystem outputs the indication via a graphical interface. For example, the reporting subsystem updates the graphical interface 104 shown in FIG. 1 by transmitting instructions to the user device (and/or an intermediate web server), thereby causing the user device to display the updated graphical interface. As a specific example, the reporting subsystem transmits instructions causing the graphical interface to be modified to highlight the entities, show the entities in bold or other fonts, place a box around the entities, and so forth. Alternatively, or additionally, the privacy alert includes text (e.g., "Warning! Uploading this image exposes identifying information. Cancel?). For example, the reporting subsystem transmits a signal causing the graphical interface to display text explaining the potential privacy risk posed by the flagged content item. Alternatively, or additionally, the reporting subsystem causes display of an indication of a privacy risk level (e.g., a safety grade), such as a color code and/or text. In some implementations, the reporting subsystem causes display of a cloud of words and/or images that delineates everything a user has disclosed collectively across posts that could be used to identify the user.

Alternatively, or additionally, the reporting subsystem outputs an audio alert. As another example, the reporting subsystem sends a text message or electronic mail (email) message to output the indication. As another example, the reporting subsystem outputs the indication by transmitting instructions from one module or device to another module or device. For example, the reporting subsystem transmits an indication that a content item should be removed to a content curation system, thereby causing the content curation system to remove or edit the content.

In some embodiments, subsequent to the processing of block 210, the execution of the recommended action changes the potential exposure of the private information indicated by the privacy score. Responsive to outputting the indication of the recommended action for mitigating the cumulative privacy risk, the privacy monitoring system applies a modification to a content item, of the content items. For example, a user interacts with the graphical interface to edit an image to blur out a face. As another example, the privacy monitoring system requests user permission to modify a content item, and, if the user provides the permission, then the privacy monitoring system modifies the content item. For example, the privacy monitoring system provides the output "Your house number is exposed. Do you want to blur it out?", and, upon receiving an affirmative response from the user, the privacy monitoring system modifies the content to blur out the house number.

In some embodiments, subsequent to applying the modification, the content retrieval subsystem computes an updated privacy score. For example, the content retrieval subsystem detects a modification to a content item entered into the input field of the graphical interface. Responsive to detecting the modification, the entity identification subsystem identifies a modified set of entities associated with identifying information by at least applying the trained machine learning model to the modified content item. The scoring subsystem computes a modified privacy score for the user as a function of the modified entities.

In some embodiments, the privacy monitoring system provides a tool including an element for a user to provide feedback to control the sensitivity of the privacy scoring. For example, the graphical interface includes sliders that the user can use to control the privacy sensitivity of the model. If the privacy sensitivity is higher, then the system is more likely to generate privacy alerts. For example, if the privacy sensitivity level is increased, the models used to generate the privacy score are modified to identify more entities and/or to weight entities and links between the entities more heavily. For a lower privacy sensitivity level, certain entities are not identified as risky and/or not weighted as heavily. In some embodiments, the privacy monitoring system re-executes the operations at blocks 202-210 responsive to detecting a change to such a privacy sensitivity modification element, which can result in a modified privacy score.

Examples Content Items with Identifying Information

Figure 3A:
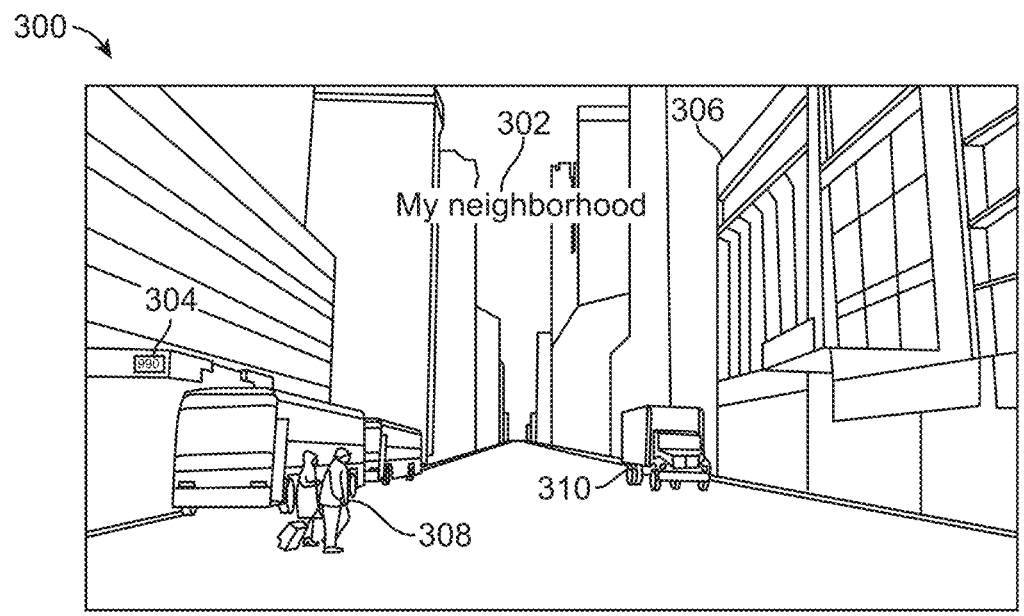
FIGS. 3A-3D illustrate examples of a content items that include information which can expose sensitive information in the aggregate, according to certain embodiments of the present disclosure.

FIGS. 3A-3D depict examples of content items with identifying information 300-340 according to certain embodiments. FIG. 3A shows an image 300, e.g., as posted on the Internet via social media. The image 300 can be used to extract information including text 302 ("my neighborhood," e.g., captioned by the poster). The image 300 further includes a building address 304 (9990). The building address 304 can be used, or in conjunction with other information such as identifiable buildings 306, to determine a location of the image 300. That, along with the text 302, can be used to infer that the poster lives near the determined location. Other data that can be extracted from image 300 includes people 308. The people 308 may be recognized using facial recognition algorithms. The image 300 further includes vehicles 310. Vehicles may be used to extract identifying information. For instance, optical character recognition is used to identify a license plate number, which can then be run through a database to identify the owner of the vehicle.

Figure 3B:
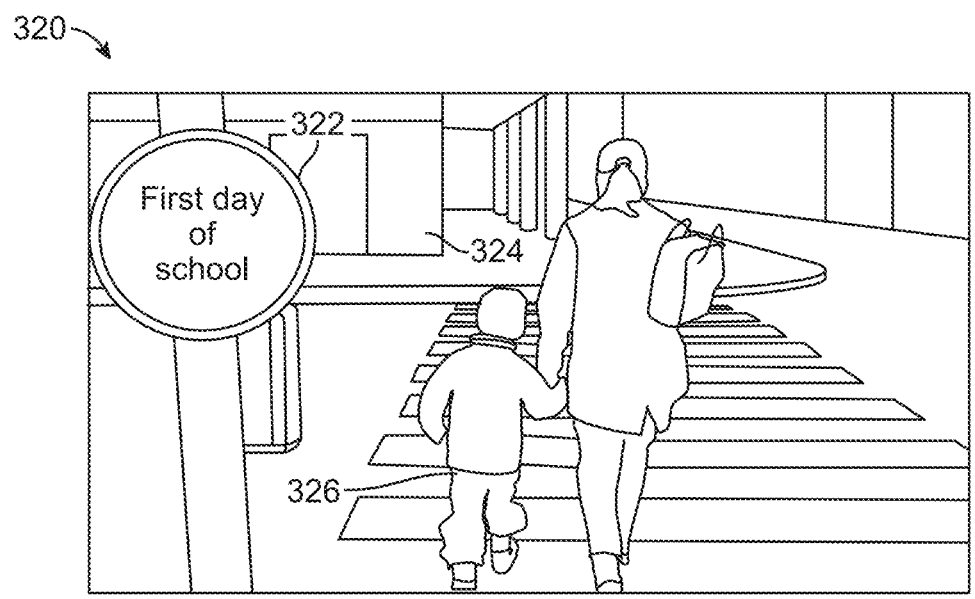

FIG. 3B shows another image 320. Similarly to the image 300 of FIG. 3A, the image 320 includes text 322, buildings 324, and people 326. Given the text 322 "first day of school," it can be determined that the poster has a child (one of the people 326) and that they live and/or go to school near the location of the image 320.

Figure 3C:
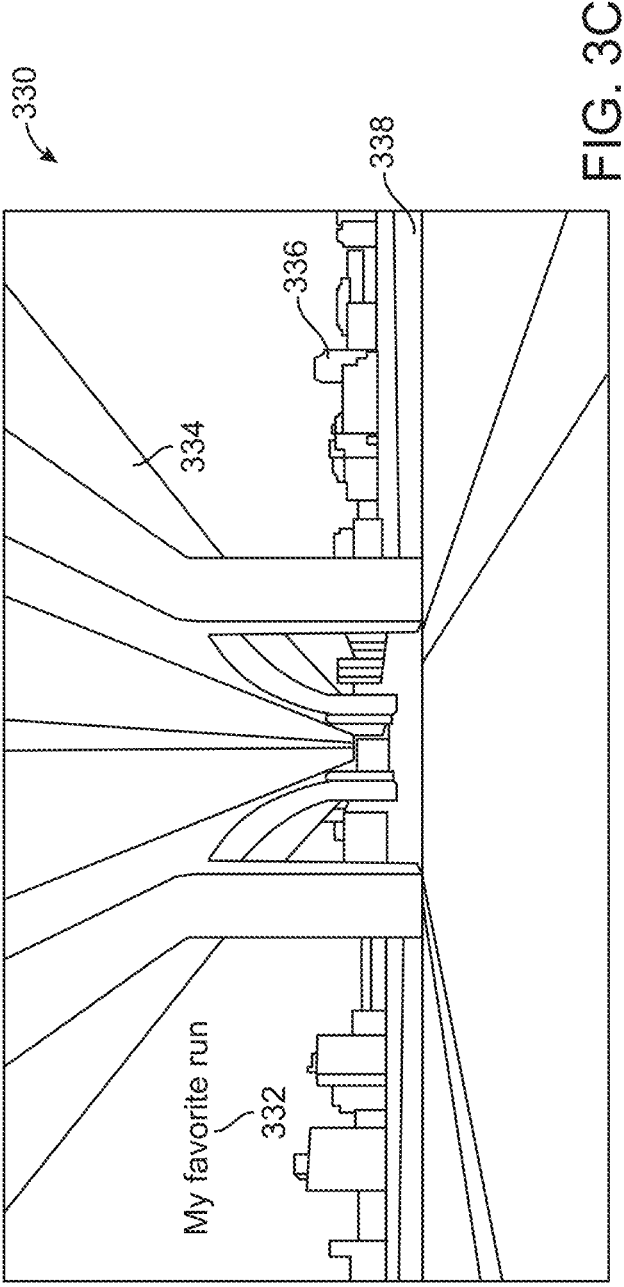

FIG. 3C shows another image 330. The image 330 includes the text 332 "My favorite run," which indicates that the poster is frequently at the location corresponding to the image 330. Further, the image 330 includes distinctive buildings 336, a body of water 338, and a bridge 334. Machine learning can be used to identify the location of the image 330 based on the bridge 334 and buildings 336, as well as the body of water 338.

Figure 3D:
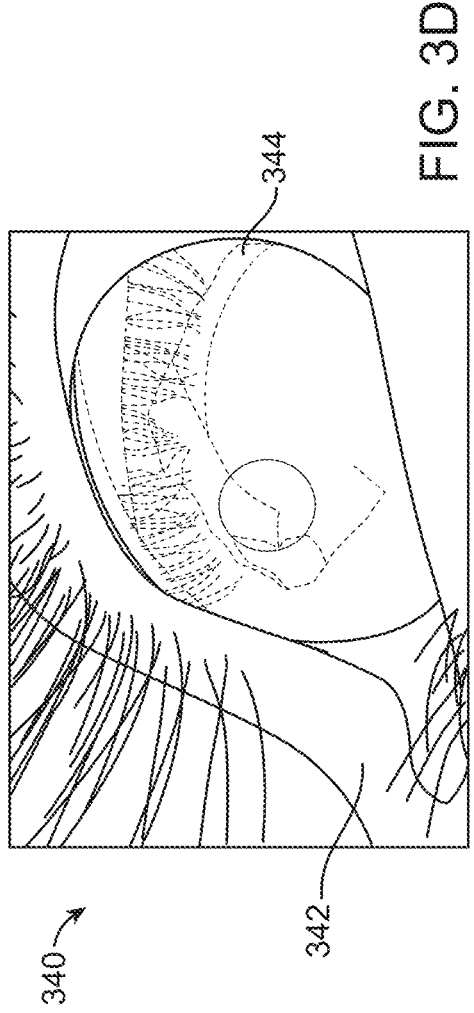

FIG. 3D shows another image 340 illustrating another example of inadvertent disclosure of information. In image 340, an eye 342 is shown. A reflection 344 is visible in the eye 342. By enhancing the image, it is possible to extract identifying information from the reflection 344 (e.g., a location, person, written text, etc.). There is a documented case of stalking and injury of a popstar through analysis of images shared by the individual including a reflection. Given that nefarious actors are gleaning information from subtleties such as reflections, in some embodiments, the privacy monitoring system extracts information from subtle data elements such as reflections to prevent such unforeseen problems.

Figure 4B:
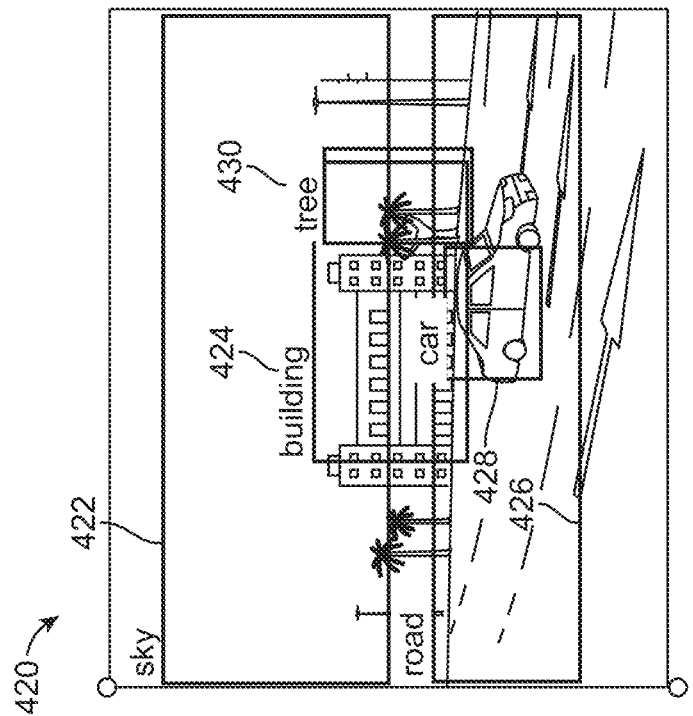
FIGS. 4A and 4B depict examples of content items illustrating data extraction and classification, according to certain embodiments of the present disclosure.
Figure 4A:
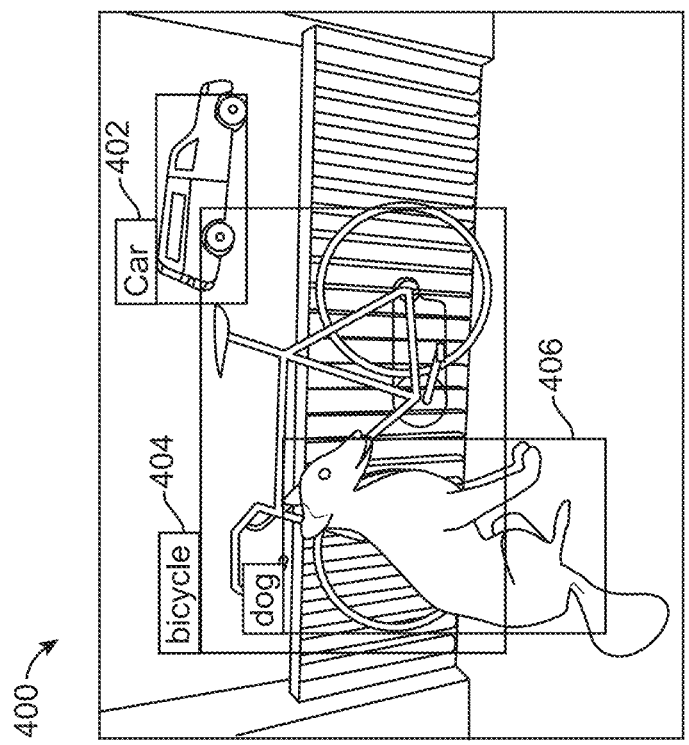

FIGS. 4A-4B depict examples of data extraction in content items 400 and 420 according to certain embodiments. In FIG. 4A, an image 400 includes data elements including a car 402, a bicycle 404, and a dog 406. Image segmentation algorithms can be used to extract each data element 402-406. In FIG. 4B, an image 420 includes data elements including a sky 422, a building 424, a road 426, a car 428, and a tree 430. Image segmentation algorithms can be used to extract each data element 422-430.

Figure 5:
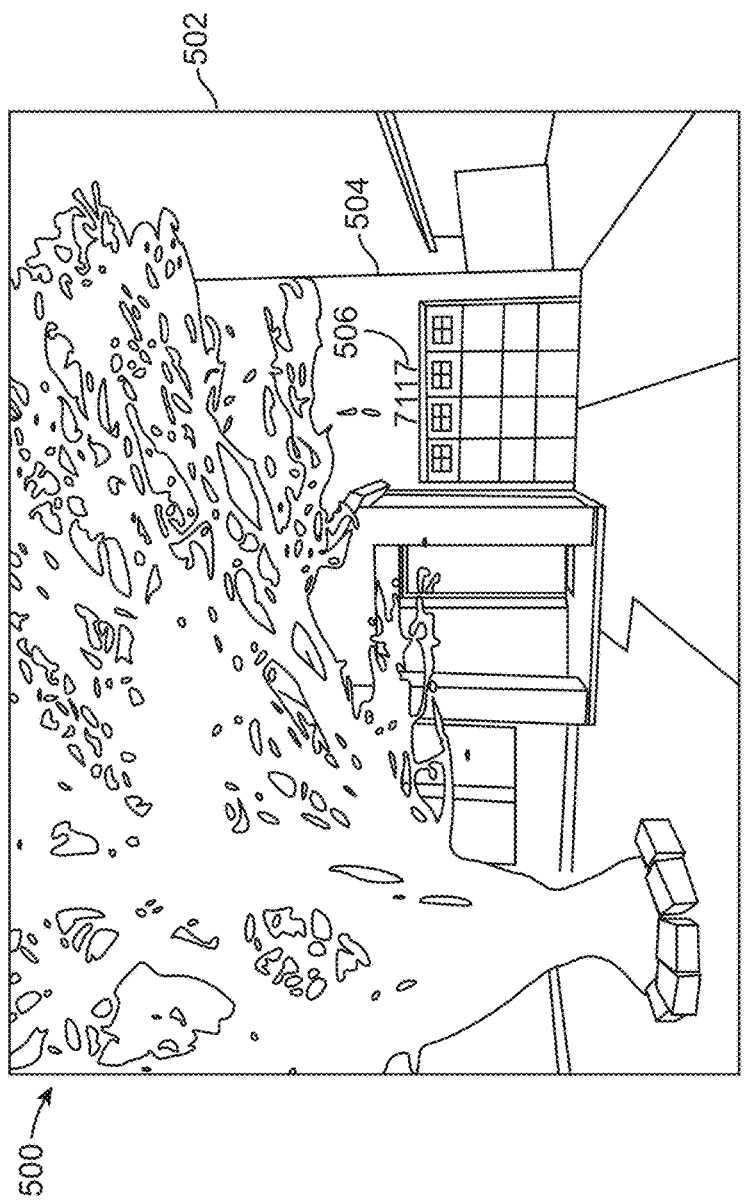
FIG. 5 depicts an example of a set of content items that expose location information in the aggregate, according to certain embodiments of the present disclosure.
Figure 5:
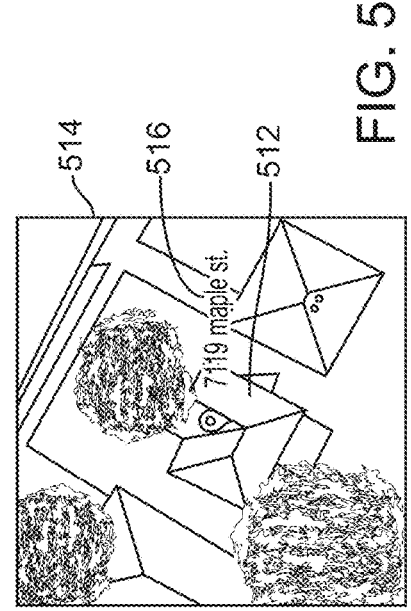
Figure 5:
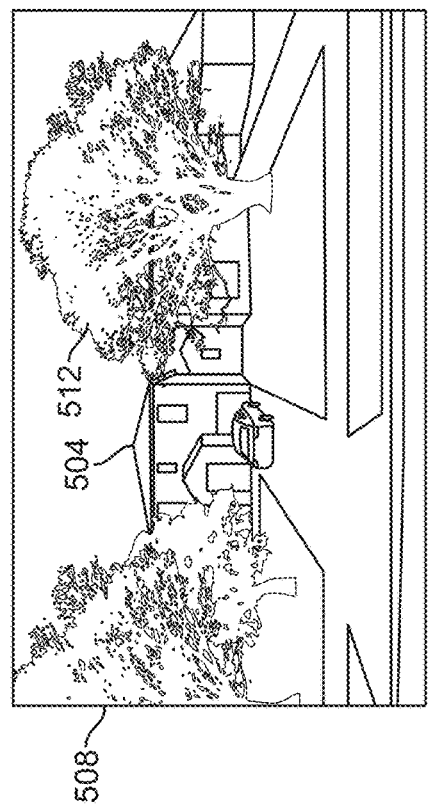

FIG. 5 shows a set of images 502, 508, and 514, which, in the aggregate, can expose sensitive information. Image 502 shows a house 504 including a house number 506. Although the street or city may not be apparent from the image 502 or associated metadata, the house number 506 and the appearance of the house 504 can be used in along with information in images 508 and 514 to triangulate the location of the house 504. In image 508, the same house 504 is shown, along with a neighbor's house 512. If that neighbor's house 512 is posted in an image including address information 516, this can be used to identify the exact address of the first house 504.

Examples of Operations for Training a Domain-Specific Neural Network

FIG. 6 depicts an example of a process 600 for training a domain-specific neural network as used in the process of FIG. 2, according to certain embodiments. In this example, the content retrieval subsystem 112 of the privacy monitoring system 110 retrieves additional content and the content segmentation subsystem 114 extracts image and/or audio data from the content. The training subsystem 122 trains a domain-specific neural network to recognize different types of entities associated with a privacy risk, and the privacy monitoring system applies this domain-specific neural network at block 206 of FIG. 2 to identify entities and entity types associated with identifying information. In some embodiments, one or more processing devices implement operations depicted in FIG. 6 by executing suitable program code. For illustrative purposes, the process 600 is described with reference to certain examples depicted in the figures. Other implementations, however, are possible.

At block 602, the content retrieval subsystem collects additional content items. In some embodiments, the content items are collected from public sources. For example, the additional content items are retrieved from one or more websites and/or applications, such as social media sites or applications, corporate employee profiles, real estate listing sites and so forth.

At block 604, the content segmentation subsystem extracts image and/or audio data from the collected additional content items. The content segmentation subsystem may extract the image and/or audio data in a similar fashion as described above with respect to block 204 of FIG. 2. Alternatively, or additionally, the content segmentation subsystem extracts text data and/or metadata.

At block 606, the training subsystem associates the extracted image or audio data with labels for a set of entity types to generate domain-specific training data. The entities may be labeled with the entity types manually or automatically. Examples of entity types that can be used to label the training data include "building," "street," "email address," "employer," "nearby landmark," and so forth. As some specific examples, an image of a house is labeled "building," a person's name is labeled "name," and an image of a person is labeled "person." The entities may further be labeled with more specific labels (e.g., person+John Smith; building+800 Main Street, etc.). In some embodiments, the labeled training data 126 is stored to the data storage unit 124.

In some embodiments, the training subsystem labels a curated set of entities at varying levels of sensitivity. Entities related to medical, health and financial information are labeled at the highest level of sensitivity. Another set of entities can then be labeled at a medium level of sensitivity (example: those related to demographic and geolocation). This entity labeling can be done in a coarse, high, medium, and low or at a finer level of gradation. In some embodiment, each entity is further labeled to specify a domain indicating a category of identifying information, such as recreation, location, and political alignment. These sensitivities may further reflect risk signatures. For example, the scoring subsystem uses a risk signature to narrow the scope of analysis to the boundaries of the entity data in the risk signature, such that the training data are highly specific to the risk signature.

At block 608, the training subsystem trains a domain-specific neural network to identify entity types against the domain-specific training data. Each domain-specific network is trained to identify entities in a particular domain. For example, a neural network for location is trained to recognize particular buildings (e.g., the Empire State Building, Coit Tower, 53 Pine Street, etc.) and bodies of water (e.g., the Pacific Ocean, the Hudson River, etc.). A neural network for political alignment is trained to recognize political signs and buttons. Accordingly, in some implementations, the training subsystem trains a set of different domain-specific neural networks. Other examples of domain-specific training include limiting training to habits, persons, clubs, hobbies, political events, religious activities, or social events. Each domain-specific neural network is trained to recognize a particular entity type. A domain may include multiple entity types (e.g., the "location" domain corresponds to the entity types building, address, bridge, etc.), or a single entity type (e.g., a "person" domain corresponds to a single entity type, "persons").

Alternatively, or additionally, learning is done on narrowed geolocations (e.g., a neural network is trained to recognize locations within the state of California). Training a neural network to broadly identify information in all domains and all media types and locations across the Internet can be computationally expensive to the point of infeasibility. By focusing the neural networks on a particular domain and/or location, training time is significantly reduced. In some implementations the domain-specific training techniques further result in a neural network that executes more quickly at runtime (e.g., in determining a cumulative privacy risk as described above with respect to FIG. 2).

In some embodiments, the domain-specific neural networks are trained on curated datasets of training data of varying degrees of sensitivity. The sensitivity degrees may align with the domains. For instance, curated datasets of training data related to personal financial information, medical, and health-related information would be classified at the highest level of sensitivity. These sensitive datasets would then be used to train a model to detect entities prominent in these curated sets. The curated set of named entities that reflects various degrees of sensitivity either in isolation or in combination with other entities is used to train the corresponding domain-specific neural networks to detect their usage and to score the sensitivity of the content associated with the user.

In some embodiments, each domain-specific neural network is trained using backpropagation. For example, a neural network receives training data as input and outputs a predicted result. This result is compared to the label assigned to that training data. In some implementations, the comparison is performed by determining gradients based on the input and predicted result (e.g., by minimizing a loss function by computing and minimizing a loss value representing an error between the predicted result and the actual label value). The computed gradient is then used to update parameters of the neural network.

Although some implementations use a set of domain-specific neural networks, other implementations are possible. For example, another type of machine learning model is implemented (e.g., a logistic regression model or a decision tree). In some implementations, a single machine learning model is trained to recognize entities in multiple domains.

A processing device executes program code of the training subsystem 122 to implement blocks 602-608. For example, the program code for the training subsystem 122, which is stored in a non-transitory computer-readable medium, is executed by one or more processing devices. Executing the code of the training subsystem 122 causes the processing device to access the training data 126 from the same non-transitory computer-readable medium or a different non-transitory computer-readable medium. In some embodiments, accessing the training data involves communicating, via a data bus, suitable signals between a local non-transitory computer-readable medium and the processing device. In additional or alternative embodiments, accessing the training data involves communicating, via a data network, suitable signals between a computing system that includes the non-transitory computer-readable medium and a computing system that includes the processing device.

Figure 7:
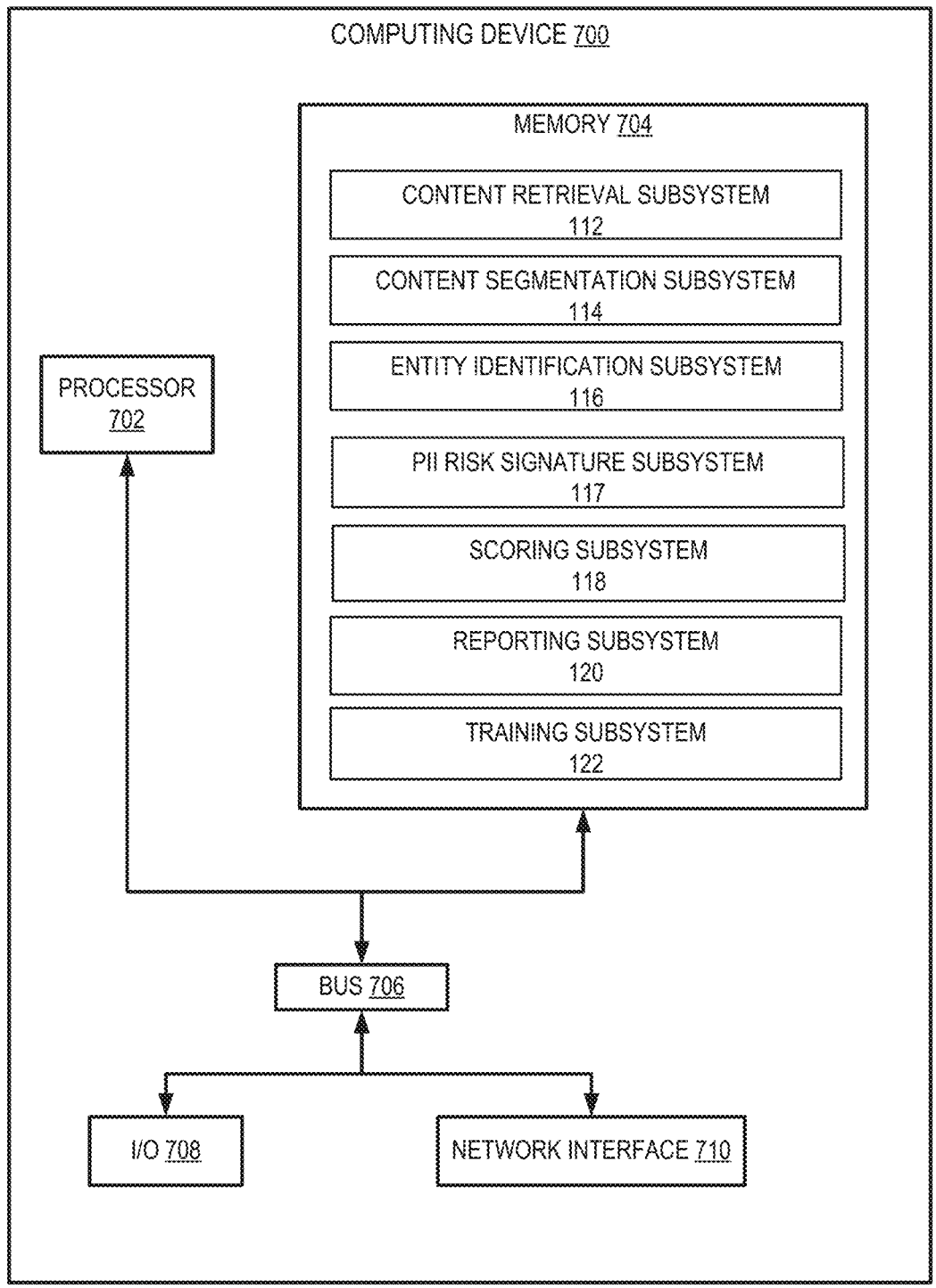
FIG. 7 depicts an example of a computing system that performs certain operations described herein, according to certain embodiments of the present disclosure.

Example of a Computing System for Mitigating Aggregate Exposure of Identifying Information Any suitable computing system or group of computing systems can be used for performing the operations described herein. For example, FIG. 7 depicts examples of computing system 700 that executes a scoring subsystem 118. In some embodiments, the computing system 700 also executes the content retrieval subsystem 112, content segmentation subsystem 114, entity identification subsystem 116, PII risk signature subsystem 117, reporting subsystem 120, and/or training subsystem 122 as depicted in FIG. 1. In other embodiments, a separate computing system having devices similar to those depicted in FIG. 7 (e.g., a processor, a memory, etc.) executes one or more of the subsystems 112-122.

The depicted examples of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the content retrieval subsystem 112, content segmentation subsystem 114, or other suitable applications that perform one or more operations described herein. The program code may be resident in the memory device 704 or any suitable computer-readable medium and may be executed by the processor 702 or any other suitable processor. In some embodiments, both the content retrieval subsystem 112 and the content segmentation subsystem 114 are stored in the memory device 704, as depicted in FIG. 7. In additional or alternative embodiments, one or more of the content retrieval subsystem 112 and the content segmentation subsystem 114 are stored in different memory devices of different computing systems. In additional or alternative embodiments, the program code described above is stored in one or more other memory devices accessible via a data network.

The computing system 700 can access one or more of the training data 126 (e.g., as depicted in FIG. 1) in any suitable manner. In some embodiments, some or all of one or more of these data sets, models, and functions are stored in the memory device 704, as in the example depicted in FIG. 7. For example, a computing system 700 that executes the training subsystem 122 can access training data 126 stored by an external system.

In additional or alternative embodiments, one or more of these data sets, models, and functions are stored in the same memory device (e.g., the memory device 704). For example, a common computing system, such as the privacy monitoring system 110 depicted in FIG. 1, can host the content retrieval subsystem 112 and the scoring subsystem 118 as well as the training data 126. In additional or alternative embodiments, one or more of the programs, data sets, models, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices (e.g., a computing device executing a graphical interface 104 as depicted in FIG. 1) via a data network using the network interface device 710.

Figure 8:
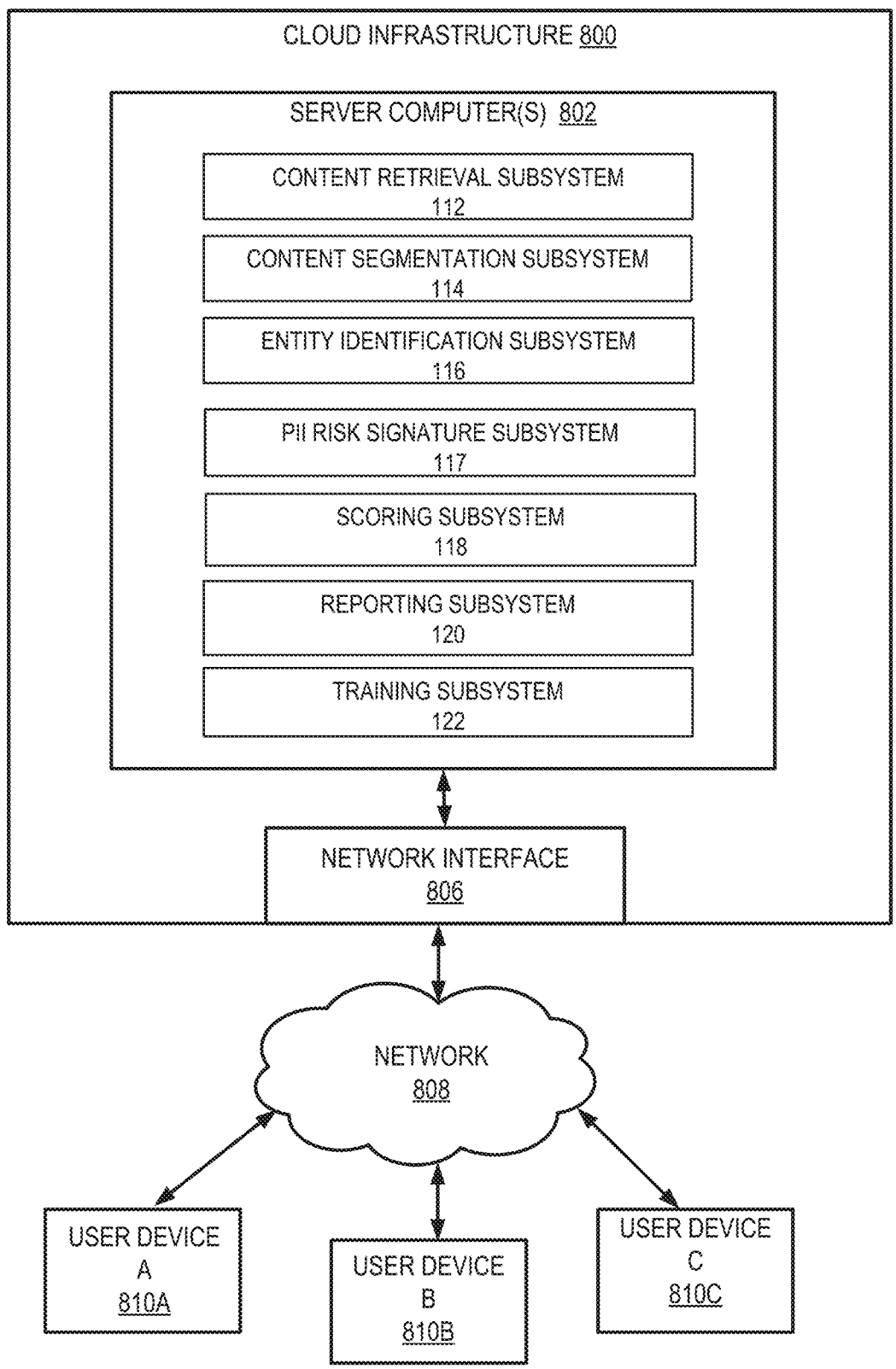
FIG. 8 depicts an example of a cloud computing environment that performs certain operations described herein, according to certain embodiments of the present disclosure.

In some embodiments, the functionality provided by the computing system 700 may be offered via a cloud-based service provided by a cloud infrastructure 800 provided by a cloud service provider. For example, FIG. 8 depicts an example of a cloud infrastructure 800 offering one or more services including a service that offers virtual object functionality as described in this disclosure. Such a service can be subscribed to and used by a number of user subscribers using user devices 810A, 810B, and 810C across a network 808. The service may be offered under a Software as a Service (SaaS) model. One or more users may subscribe to such as service.

In the embodiment depicted in FIG. 8, the cloud infrastructure 800 includes one or more server computer(s) 802 that are configured to perform processing for providing one or more services offered by the cloud service provider. One or more of server computer(s) 802 may implement a content retrieval subsystem 112, content segmentation subsystem 114, entity identification subsystem 116, PII risk signature subsystem 117, scoring subsystem 118, reporting subsystem 120, and/or training subsystem 122 as depicted in FIG. 1. The subsystems 112-122 may be implemented using software only (e.g., code, program, or instructions executable by one or more processors provided by cloud infrastructure 800), in hardware, or combinations thereof. For example, one or more of the server computer(s) 802 may execute software to implement the services and functionalities provided by subsystems 112-122, where the software, when executed by one or more processors of the server computer(s) 802, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 802 can include volatile memory, non-volatile memory, or a combination thereof.

In the embodiment depicted in FIG. 8, cloud infrastructure 800 also includes a network interface device 806 that enables communications to and from cloud infrastructure 800. In certain embodiments, the network interface device 806 includes any device or group of devices suitable for establishing a wired or wireless data connection to the network 808. Non-limiting examples of the network interface device 806 include an Ethernet network adapter, a modem, and/or the like. The cloud infrastructure 800 is able to communicate with the user devices 810A, 810B, and 810C via the network 808 using the network interface device 806.

A graphical interface (e.g., graphical interface 104 as depicted in FIG. 1) may be displayed on each of the user devices user device A 810A, user device B 810B, and user device C 810C. A user of user device 810A may interact with the displayed graphical interface, for example, to enter text data and upload media files. In response, processing for identifying and displaying privacy alerts may be performed by the server computer(s) 802. Responsive to these alerts, the user may again interact with the graphical interface to edit the text data to address any privacy concerns.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks.

Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
identifying, with an entity identification subsystem, a plurality of entities in at least one domain and an entity type for each entity of the plurality of entities, wherein the entity type is one of a set of entity types comprising one or more of a street name, a building, a person, or a medical status, and wherein identifying the plurality of entities comprises applying a set of domain-specific neural networks, each domain-specific neural network trained to recognize a particular entity type, of the set of entity types, to media data extracted from two or more content items associated with a user;
computing, by a scoring subsystem, a privacy score indicating a cumulative privacy risk for potential exposure of identifying information associated with the user based at least in part on the two or more content items, the privacy score computed by identifying connections between at least a subset of the identified plurality of entities, the connections between the entities weighted according to the entity types, indicating relations between two or more different entities of the plurality of entities, and contributing to the privacy score; and
outputting, by a reporting subsystem, an indication of a recommended action for mitigating the cumulative privacy risk.

2. The method of claim 1, wherein the privacy score is further computed by:
identifying a user-specific data set comprising identifying information associated with the user;
extracting data from the user-specific data set, wherein the extracted data is used to identify additional connections contributing to the privacy score; and
updating the user-specific data set to include at least a subset of the identified entities.

3. The method of claim 1, further comprising:
identifying, by a Personally Identifying Information (PII) risk signature subsystem, a privacy breach event associated with the user; and
applying a deep learning model to information associated with the privacy breach event to generate a risk signature indicating entity types that pose a heightened risk for the user,
wherein the connections between the entities are further weighted based on the generated risk signature.

4. The method of claim 1, wherein:
a content item of the two or more content items is a video; and
the method further comprises extracting the media data from the content item by at least:
extracting an image from the video; and
segmenting the extracted image to isolate one or more of the plurality of entities.

5. The method of claim 4, wherein the media data comprises audio signals, the method further comprising:
extracting audio data from the video;
analyzing the extracted audio data for transitions;
extracting the audio signals from the analyzed audio data; and
segmenting the extracted audio signals to isolate one or more of the plurality of entities.

6. The method of claim 1, further comprising:
training each of the domain-specific neural networks to identify the entities by:
collecting additional content items from a public source;
extracting image or audio data from the collected additional content items;
associating the extracted image or audio data with labels for a set of entity types to generate domain-specific training data; and
training each domain-specific neural network to identify entity types against the domain-specific training data.

7. The method of claim 1, further comprising:
detecting user interaction with an upload element of a graphical interface; and
retrieving a content item of the two or more content items in response to detecting the user interaction with the upload element.

8. The method of claim 1, further comprising:
responsive to outputting the indication of the recommended action for mitigating the cumulative privacy risk, applying a modification to a content item, of the two or more content items.

9. The method of claim 1, further comprising:
receiving user identification of a set of data sources,
wherein the two or more content items are collected from the identified set of data sources.

10. A computing system comprising:
a content retrieval subsystem comprising software and hardware configured to retrieve two or more content items associated with a user;
a content segmentation subsystem comprising software and hardware configured to extract data from the two or more content items;
an entity identification subsystem comprising software and hardware configured to identify a plurality of entities in at least one domain and an entity type for each entity of the plurality of entities, wherein the entity type is one of a set of entity types comprising one or more of a street name, a building, a person, or a medical status, and wherein identifying the plurality of entities comprises at least applying a set of domain-specific neural networks, each domain-specific neural network trained to recognize a particular entity type, of the set of entity types, to the extracted data;
a scoring subsystem comprising software and hardware configured to compute a privacy score indicating a cumulative privacy risk for potential exposure of identifying information associated with the user based at least in part on the two or more content items, the privacy score computed by identifying connections between at least a subset of the identified plurality of entities, the connections between the entities contributing to the privacy score based on weights assigned to links between the entities in a graph model according to identified entity types for the respective entities and indicating relations between two or more different entities of the plurality of entities; and
a reporting subsystem comprising software and hardware configured to output an indication of a recommended action for mitigating the cumulative privacy risk.

11. The computing system of claim 10, wherein the privacy score is further computed by:
identifying a user-specific data set comprising identifying information associated with the user;
extracting data from the user-specific data set, wherein the extracted data is used to identify additional connections contributing to the privacy score; and
updating the user-specific data set to include at least a subset of the identified entities.

12. The computing system of claim 10, wherein:
an item of the two or more content items is a video; and
extracting the data from the item comprises:
  extracting an image from the video; and
  segmenting the extracted image to isolate one or more of the plurality of entities.

13. The computing system of claim 12, wherein:
extracting the data from the item further comprises:
  extracting audio data from the video;
  analyzing the extracted audio data for transitions;
  extracting audio signals from the analyzed audio data; and
  segmenting the extracted audio signals to isolate one or more of the plurality of entities.

14. The computing system of claim 10, further comprising:
  a training subsystem comprising software and hardware configured to train each of the domain-specific neural networks to identify the entities by:
  collecting additional content items from a public source;
  extracting image or audio data from the collected additional content items;
  associating the extracted image or audio data with labels for a set of entity types to generate domain-specific training data; and
  training each domain-specific neural network to identify entity types against the domain-specific training data.

15. The computing system of claim 10, wherein the content retrieval subsystem is further configured to:
  detect user interaction with an upload element of a graphical interface, wherein retrieving a content item of the two or more content items is in response to detecting the user interaction with the upload element.

16. The computing system of claim 10, further comprising a Personally Identifying Information (PII) risk signature subsystem configured to:
  identify a privacy breach event associated with the user; and
  apply a deep learning model to information associated with the privacy breach event to generate a risk signature indicating entity types that pose a heightened risk for the user,
  wherein the connections between the entities are further weighted based on the generated risk signature.

17. A non-transitory computer-readable medium having instructions stored thereon, the instructions executable by a processing device to perform operations comprising:
  retrieving two or more content items associated with a user;
  a step for computing a privacy score indicating a cumulative privacy risk for potential exposure of identifying information associated with the user from the two or more content items using a set of domain-specific neural networks trained to identify entities of specific types within the content items, wherein the types of entities comprise one or more of a street name, a building, a person, or a medical status; and
  outputting an indication of a recommended action for mitigating the cumulative privacy risk.

18. The non-transitory computer-readable medium of claim 17, wherein the privacy score is further computed by:
  identifying a user-specific data set comprising identifying information associated with the user;
  extracting data from the user-specific data set, wherein the extracted data is used to identify additional connections contributing to the privacy score; and
  updating the user-specific data set to include at least a subset of the identified entities.

19. The non-transitory computer-readable medium of claim 17, wherein a content item of the two or more content items is a video;
the operations further comprising:
  extracting an image from the video; and
  segmenting the extracted image to isolate an entity that is used in computing the privacy score.

20. The non-transitory computer-readable medium of claim 19, the operations further comprising:
  extracting audio data from the video;
  analyzing the extracted audio data for transitions;
  extracting audio signals from the analyzed audio data; and
  segmenting the extracted audio signals to isolate a second entity that is used in computing the privacy score.

* * * * *